(12) United States Patent
Kuperman et al.

(10) Patent No.: US 8,123,934 B2
(45) Date of Patent: Feb. 28, 2012

(54) SYSTEM AND METHOD FOR PRETREATMENT OF SOLID CARBONACEOUS MATERIAL

(75) Inventors: Alexander E. Kuperman, Orinda, CA (US); Jinyi Han, Danville, CA (US)

(73) Assignee: Chevron U.S.A., Inc., San Ramon, CA (US)

( * ) Notice: Subject to any disclaimer, the term of this patent is extended or adjusted under 35 U.S.C. 154(b) by 813 days.

(21) Appl. No.: 12/213,393

(22) Filed: Jun. 18, 2008

(65) Prior Publication Data

US 2009/0314684 A1    Dec. 24, 2009

(51) Int. Cl.
*C10G 11/04* (2006.01)
(52) U.S. Cl. ........ 208/400; 208/415; 208/417; 208/418; 208/419; 208/420
(58) Field of Classification Search .................. 208/400, 208/415, 417–422
See application file for complete search history.

(56) References Cited

U.S. PATENT DOCUMENTS

| | | | |
|---|---|---|---|
| 3,645,885 A | 2/1972 | Harris et al. | |
| 4,077,867 A | 3/1978 | Aldridge et al. | |
| 4,401,549 A | 8/1983 | Urban | |
| 4,401,550 A | 8/1983 | Urban | |
| 4,417,972 A | 11/1983 | Francis et al. | |
| 4,434,043 A | 2/1984 | Singhal et al. | |
| 4,450,066 A | 5/1984 | Stone et al. | |
| 4,485,006 A | 11/1984 | Biceroglu | |
| 4,485,008 A | 11/1984 | Maa et al. | |
| 4,565,622 A | 1/1986 | Nakako et al. | |
| 4,578,176 A | 3/1986 | Tarman | |
| H000069 H | 6/1986 | Appell et al. | |
| 4,595,488 A | 6/1986 | Pecci et al. | |
| 4,617,105 A | 10/1986 | Miller | |
| 4,617,106 A * | 10/1986 | Garg | 208/418 |
| 4,816,141 A | 3/1989 | McLean et al. | |
| 4,824,558 A | 4/1989 | Maa et al. | |
| 4,831,003 A | 5/1989 | Lang et al. | |
| 4,917,791 A | 4/1990 | Kang | |
| 4,923,838 A | 5/1990 | Khulbe et al. | |
| 4,948,523 A | 8/1990 | Hutchison et al. | |
| 5,015,366 A | 5/1991 | Ruether et al. | |
| 5,039,392 A | 8/1991 | Bearden, Jr. et al. | |
| 5,051,389 A | 9/1991 | Lang et al. | |
| 5,094,991 A | 3/1992 | Lopez et al. | |

(Continued)

FOREIGN PATENT DOCUMENTS

AU    9179174    1/1992

(Continued)

OTHER PUBLICATIONS

Song, C. et al. "Effects of Low-Temperature Catalytic Pretreatments on Coal Structure and Reactivity in Liquefaction," *Technical Progress Report*—Apr. 1992 to Jul. 1992, *Fuel Science Program*, Department of Materials Science and Engineering, The Pennsylvania State University (Aug. 1992) pp. 1-93.

(Continued)

*Primary Examiner* — Walter D Griffin
*Assistant Examiner* — Brian McCaig
(74) *Attorney, Agent, or Firm* — Jones Day

(57) ABSTRACT

This invention encompasses systems and methods for pretreating a carbonaceous material, comprising heating to a suitable temperature and for a suitable reaction time, a mixture comprising the carbonaceous material, one or more catalysts or catalyst precursors, and a hydrocarbonaceous liquid.

19 Claims, 5 Drawing Sheets

U.S. PATENT DOCUMENTS

| | | | |
|---|---|---|---|
| 5,151,173 | A | 9/1992 | Vaughn et al. |
| 5,183,561 | A | 2/1993 | Kresge et al. |
| 5,200,063 | A | 4/1993 | Neskora et al. |
| 5,236,881 | A | 8/1993 | Jones |
| 5,246,570 | A | 9/1993 | Cronauer et al. |
| 5,332,489 | A | 7/1994 | Veluswamy |
| 5,336,395 | A | 8/1994 | Pabst et al. |
| 5,338,441 | A | 8/1994 | LeViness et al. |
| 5,344,553 | A | 9/1994 | Shih |
| 5,454,934 | A | 10/1995 | Reynolds et al. |
| 5,484,755 | A | 1/1996 | Lopez |
| 5,489,375 | A | 2/1996 | Joseph et al. |
| 5,573,556 | A | 11/1996 | Wen |
| 5,620,591 | A | 4/1997 | Poole et al. |
| 5,728,656 | A | 3/1998 | Yamaguchi et al. |
| 5,744,026 | A | 4/1998 | Zoeller |
| 5,783,065 | A | 7/1998 | Wiser et al. |
| 6,054,043 | A | 4/2000 | Simpson |
| 6,139,723 | A | 10/2000 | Pelrine et al. |
| 6,153,155 | A | 11/2000 | Wen et al. |
| 6,153,156 | A | 11/2000 | Lawrence et al. |
| 6,190,542 | B1 | 2/2001 | Comolli et al. |
| 6,551,965 | B2 | 4/2003 | Nagamatsu et al. |
| 6,569,818 | B2 | 5/2003 | Nakazato et al. |
| 6,569,819 | B2 | 5/2003 | Yagishita et al. |
| 6,587,422 | B1 | 7/2003 | Tsukihashi |
| 7,053,027 | B2 | 5/2006 | Chambard et al. |
| 7,095,708 | B1 | 8/2006 | Alamouti et al. |
| 7,163,911 | B2 | 1/2007 | Boons et al. |
| 2004/0235686 | A1 | 11/2004 | Boons et al. |
| 2005/0043191 | A1 | 2/2005 | Farng et al. |
| 2007/0027043 | A1 | 2/2007 | Le Coent |
| 2007/0144944 | A1 | 6/2007 | Del Bianco et al. |

FOREIGN PATENT DOCUMENTS

| | | |
|---|---|---|
| CA | 1273593 | 9/1990 |
| CA | 2041722 | 12/1991 |
| DE | 265416 A1 | 3/1989 |
| DE | 3903144 A1 | 8/1989 |
| EP | 0284213 A2 | 9/1988 |
| EP | 0313736 | 5/1989 |
| EP | 0532287 | 3/1993 |
| EP | 1783194 A1 | 5/2007 |
| GB | 2101152 | 1/1983 |
| GB | 2234518 | 2/1991 |
| JP | 57117586 | 7/1982 |
| JP | 58096679 | 6/1983 |
| JP | 60212484 | 10/1983 |
| JP | 59015480 | 1/1984 |
| JP | 06234979 | 8/1984 |
| JP | 60212483 | 10/1985 |
| JP | 61028582 | 2/1986 |
| JP | 62138586 | 6/1987 |
| JP | 62209196 | 9/1987 |
| JP | 63207892 | 8/1988 |
| JP | 2142892 | 5/1990 |
| JP | 03259995 | 11/1991 |
| JP | 5271667 | 10/1993 |
| JP | 9286987 | 11/1997 |
| WO | WO 91/12297 | 8/1991 |
| WO | WO 2005/047425 A1 | 5/2005 |

OTHER PUBLICATIONS

Adschiri et al.; "A New Two-Stage Process for Supercritical Fluid Extraction of Coal With Tetralin Pretreatment"; *Fuel*; vol. 75, No. 9; pp. 1124-1128 (1996).

Beasley et al; "Enhancement of Low-Severity Coal Liquefaction by Mild Acidic Pretreatment and Further Treatment With Cyclic Olefins"; *Energy & Fuels*; vol. 10; pp. 209-215 (1996).

Bimer et al.; "Effect of Chemical Pretreatment on Coal Solubilization by Methanol-NaOH"; *Fuel*; vol. 72, Iss. 7; pp. 1063-1068 (1993).

Brannan et al.; "An Investigation of the Effect of Coal Pretreatment on Liquefaction Behavior"; ACS Div. Fuel Chem. Prepr.; vol. 38; Iss. 3; pp. 1000-1007 (1993).

Caballero et al.; "Coal Liquefaction With Anthracene Oil. Influence of Solvent Pretreatment, Temperature, Catalyst and Pressure"; Fuel Science and Tech. Int'l.; vol. 12; No. 7&8; pp. 1067-1079 (1994).

Hall et al.; "Small-Angle Neutron Scattering Evidence for the Formation of Microporosity in Pittsburgh No. 8 Coal Following Liquefaction Pretreatment by Solvents"; Energy & Fuels; vol. 8, pp. 1526-1527 (1994).

Hu et al.; "Swelling Pretreatment of Coal For Improved Liquefaction at Less Severe Conditions"; Int'l. Energy Agency, $9^{th}$ Int'l. Coal Science ICCS, 1997 Conf. Proc.; vol. 3; pp. 1465-1468 (1997).

Ivanenko et al.; "Steam Pretreatment For Coal Liquefaction", ACS Div. Fuel Chem. Prepr.; vol. 41; issue 2; pp. 700-705 (1996).

Ivanenko; "Steam Pretreatment For Coal Liquefaction"; City University of New York Dissertation; UMI Publication No. DA9732931 (1997).

Ivanenko et al.; "Improvement of Coal Direct Liquefaction by Steam Pretreatment"; Energy & Fuels; vol. 11; iss. 1; pp. 206-212 (1997).

Lim et al.; "CO Pretreatment and Liquefaction of Subbituminous Coal"; ACS Div. Fuel Chem. Prepr.; vol. 38, iss. 2; pp. 618-626 (1993).

Lalvani et al.; "Electrolytic Pretreatment of Coal for Enhanced Liquefaction"; Fuel Process. Tech.; vol. 31; iss. 3; pp. 221-232 (1992).

Miller et al.; "Mild Coal Pretreatment to Enhance Liquefaction Reactivity"; ACS Div. Fuel Chem. Prepr.; vol. 36, No. 1; pp. 1-6 (1991).

Narain et al.; "The Effect of Solvent Pretreatment on Coal Liquefactio"; U.S. Dept. of Energy, Pittsburgh Energy Technology Center, P.O. Box 10940, Pittsburgh, PA 15236; pp. 161-162.

Nguanprasert; "Use of Mild Chemical Pretreatment to Enhance Coal Reactivity"; Dissert. Abstract.

Nishioka; "Effect of Peroxides During Pretreatment for Coal Liquefaction"; Energy & Fuels;; vol. 17; pp. 506-507 (2003).

Pollack et al.; "Pretreatment for Coal Liquefaction"; ACS Div. Fuel Chem. Prepr.; vol. 36; No. 1; pp. 15-22 (1991).

Pollack et al.; "Pretreatment and Mass Transfer Effects on the Coal Liquefaction Process"; Univ. of Pittsburgh School of Eng. Dissert., UMI publications, pp. 1-349 (1991).

Rincon et al.; "Synergism in Coal Liquefaction Using Petroleum Heavy Oil Mixtures For the Liquefaction of Cerrejon Coal"; Int'l Conf. on Coal Science; pp. 375-382; ISSN #9780444428936 (1987).

Rincon et al.; "Co-processing of some Columbian Coals using Petroleum Heavy Oil as Hydrogen Donor and Anthracene Oil as Cosolvent"; Fuel; vol. 69 (1990).

Robbins et al.; "Agglomeration of Low-Rank Coal as a Pretreatment for Direct Coal Liquefaction"; Fuel; vol. 71; pp. 1039-1046 (1992).

Robbins et al.; "Agglomeration of Low-Rank Coal As A Pretreatment For Direct Coal Liquefaction"; ACS Div. Fuel Chem. Prepr.; vol. 36, No. 1; pp. 58-67 (1991).

Ross et al.; "The Effects of Hydrothermal Pretreatment of the Liquefaction of Coal"; ACS Div. Fuel Chem. Prepr.; vol. 35, No. 1; pp. 37-45 (1991).

Serio et al.; "Water Pretreatment of Coal"; ACS Div. Fuel Chem. Prepr.; vol. 36; No. 1; pp. 7-14 (1991).

Shams et al.; "Enhancing Low Severity Coal Liquefaction Reactivity Using Mild Chemical Pretreatment"; Fuel; vol. 71; Iss. 9; pp. 1015-1023 (1992).

Snape et al.; "Influence of Organic Coal Structure on Liquefaction Behavior: An Update With Emphasis on Low Severity Conditions"; Fuel Processing Technology, vol. 24; pp. 119-125 (1990).

Sugano et al.; "Effects of the Oxidation Pretreatment with Hydrogen Peroxide on the Hydrogenolysis Reactivity of Coal Liquefaction Residue"; Fuel Processing Technology; vol. 77-78; pp. 67-73 (2000).

Torres-Ordonez et al.; "Solvent and Pretreatment Effects on Coal Swelling"; ACS Div. Fuel Chem. Prepr.; vol. 38, Iss. 3; pp. 1039-1045 (1993).

Winschel et al.; "Oil Agglomeration at Low pH as a Pretreatment for Liquefaction of Wyoming (USA) Subbituminous Coal"; Int'l Energy Agency $9^{th}$ Int'l Coal Science ICCS '97 Conf. Proc.; vol. 3; pp. 1369-1372 (1997).

Wham; "Effect of Slurry Heating Rate on Short-Contact-Time Coal Liquefaction"; Fuel; vol. 66; pp. 283-284 (1987).

* cited by examiner

SYSTEM AND METHOD FOR PRETREATMENT OF SOLID CARBONACEOUS MATERIAL

FIELD OF THE INVENTION

This invention relates to systems and methods for pretreating a carbonaceous material, for liquefying a carbonaceous material, and for improving efficiency of carbonaceous material liquefaction.

BACKGROUND

Much work has been done over the years on processes for obtaining liquid and gaseous products from solid carbonaceous materials such as coal. The known processes include both catalytic and non-catalytic reactions. In catalytic processes, the hydrocarbonaceous material is typically slurried with a solvent and a catalyst, and is reacted in the presence of molecular hydrogen at elevated temperatures and pressures. U.S. Pat. No. 5,246,570, for example, describes a coal liquefaction process in which a mixture of coal, catalyst, and solvent are rapidly heated to a temperature of 600-750° F. in a preheater, and then reacted under coal liquefaction conditions in a liquefaction reaction. U.S. Pat. No. 5,573,556 describes a process for converting a carbonaceous material to normally liquid products comprising heating a slurry that comprises a carbonaceous material, a hydrocarbonaceous solvent, and a catalyst precursor to a temperature sufficient to convert the catalyst precursor to the corresponding catalyst, and introducing the slurry into a liquefaction zone. U.S. Pat. No. 5,783,065 describes a coal liquefaction process comprising impregnating coal particles with a catalyst having hydrogenation or hydrogenolysis activity; introducing the impregnated coal particles for very short periods into a turbulent flow of hydrogen-containing gas at a temperature at least about 400° C.; and quenching the temperature of the products to a temperature significantly less than 400° C.

Such conventional processes leave much room for improving the liquid and/or gas yields of hydroconverted carbonaceous materials, as well as the quality of the liquid and/or gas products that are obtained from such processes. Accordingly, a need remains for improved systems and methods for hydroconversion of carbonaceous materials, as well as improved feed materials for such systems and methods.

BRIEF SUMMARY OF THE INVENTION

In one aspect, the present invention relates to a method for pretreating a carbonaceous material, comprising heating a mixture comprising: the carbonaceous material, one or more catalysts or catalyst precursors, and a hydrocarbonaceous liquid, to a temperature sufficient and for a time sufficient to cause one or more of the catalysts or catalyst precursors to disperse into the carbonaceous material, wherein the one or more catalysts or catalyst precursors remain in substantially inactive form.

In another aspect, the present invention relates to a method for pretreating a carbonaceous material, comprising heating a mixture comprising: the carbonaceous material, one or more catalysts or catalyst precursors, and a hydrocarbonaceous liquid, at a temperature of about 100-300° C. for about 10-360 minutes.

In another aspect, the present invention relates to a method for improving efficiency of carbonaceous material liquefaction, comprising heating a mixture comprising the carbonaceous material, one or more catalysts or catalyst precursors, and a hydrocarbonaceous liquid at a temperature sufficient and for a time sufficient to cause one or more of the catalysts or catalyst precursors to disperse into the carbonaceous material, wherein the one or more catalysts or catalyst precursors remain in substantially inactive form during the heating step; and hydroconverting the pretreated carbonaceous material.

In another aspect, the present invention relates to a feed for a hydroconversion process, prepared by heating a mixture comprising a carbonaceous material, one or more catalysts or catalyst precursors, and a hydrocarbonaceous liquid at a temperature sufficient and for a time sufficient to cause one or more of the catalysts or catalyst precursors to disperse into the carbonaceous material, wherein the one or more catalysts or catalyst precursors remain in substantially inactive form.

In another aspect, the present invention relates to a feed for a hydroconversion process, prepared by heating a mixture comprising a carbonaceous material, one or more catalysts or catalyst precursors, and a hydrocarbonaceous liquid at a temperature of about 100-300° C. for about 10-360 minutes.

In another aspect, the present invention relates to a system for liquefying a carbonaceous material, comprising: at least one heating system for heating a mixture comprising the carbonaceous material, one or more catalysts or catalyst precursors, and a hydrocarbonaceous liquid at a temperature sufficient and for a time sufficient to cause one or more of the catalysts or catalyst precursors to disperse into the carbonaceous material, wherein the one or more catalysts or catalyst precursors remain in substantially inactive form; at least one hydroconversion system for converting at least a portion of the pretreated carbonaceous material to a liquid and/or gaseous product; at least one separation system for separating the liquid and/or gaseous products; at least one catalyst recovery system for recovering at least a portion of the one or more catalysts or catalyst precursors from one or more hydroconversion products; and at least one catalyst or catalyst precursor preparation system for preparing one or more catalysts or catalyst precursors using the recovered portion of the one or more catalysts or catalyst precursors.

Several embodiments of the invention, including the above aspects of the invention, are described in further detail as follows. Generally, each of these embodiments can be used in various and specific combinations, and with other aspects and embodiments unless otherwise stated herein.

DETAILED DESCRIPTION OF THE INVENTION

Figure 1:
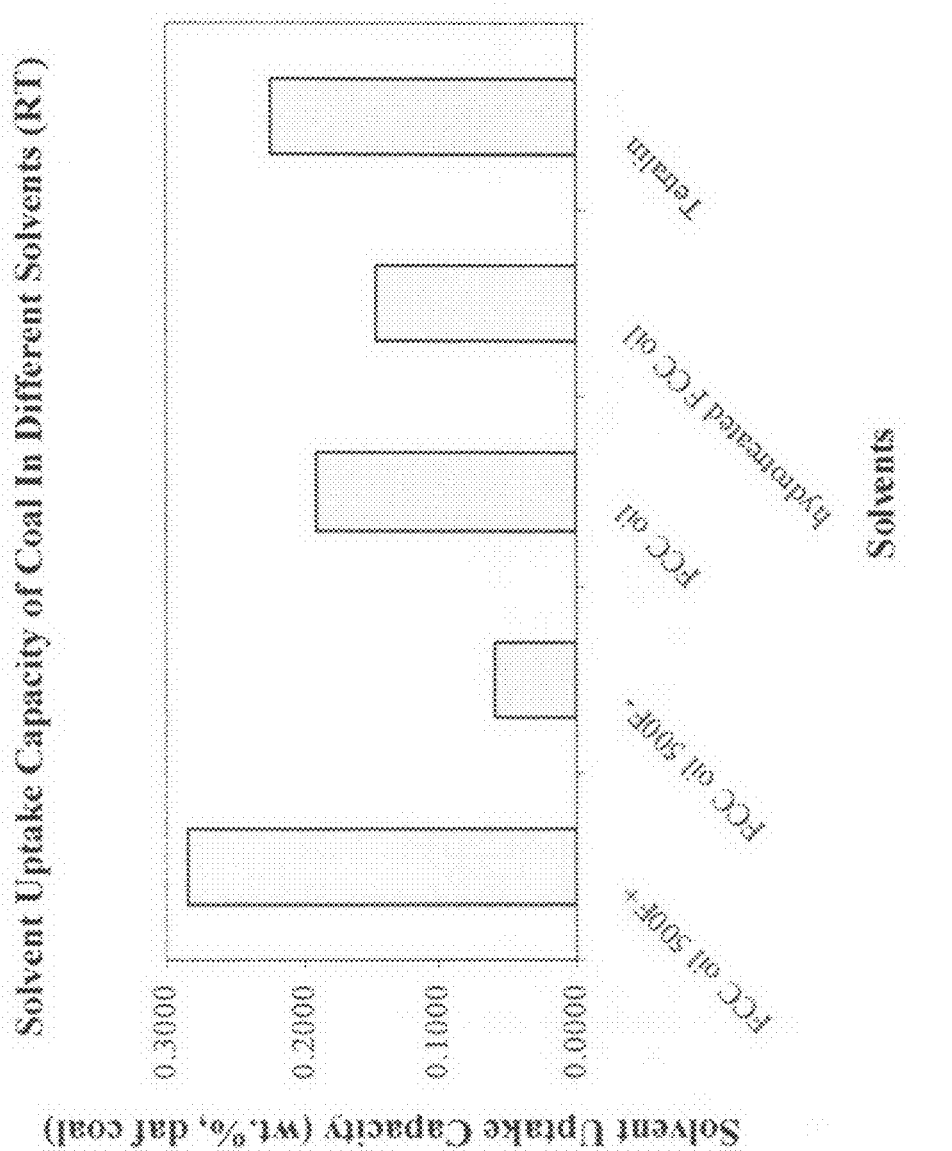
FIG. 1 is a chart showing the swelling capacity of a carbonaceous material in different types of hydrocarbonaceous liquids.

To facilitate the understanding of the subject matter disclosed herein, a number of terms, abbreviations or other shorthand as used herein are defined below. Any term, abbreviation or shorthand not defined is understood to have the ordinary meaning used by a skilled artisan contemporaneous with the submission of this specification.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

All boiling points referred to herein are atmospheric pressure boiling points unless otherwise specified.

The term "pretreat" is used herein to describe dispersing one or more catalysts or catalyst precursors into a carbonaceous material for a specific period of time and at a specific temperature.

The phrase "dispersing into," and its grammatical equivalents, is used herein to describe any manner and/or mechanism by which at least a portion of one or more catalysts or catalyst precursors move, migrate, flow, penetrate, position, embed, impregnate, and/or enter into at least one void within a carbonaceous material such as during swelling of the carbonaceous material; and/or fix, adsorb, anchor, or adhere to at least one surface of the carbonaceous material (such as by any chemical interaction or chemical bond, e.g., hydrogen bonds, covalent bonds, ionic bonds, ionic interactions, hydrogen bonds, cross-links, or interactions due to intermolecular forces, dipole interactions, London dispersion forces and the like) during swelling of the carbonaceous material, such as any outer surface of the carbonaceous material and/or the surface of any cavity, lumen, or inner surface of at least one void of the carbonaceous material.

A "void" is used herein to describe any pore, cavity, hole, gap, space, and/or channel in, on, of, or within a carbonaceous material.

"Swelling," and its grammatical equivalents, is used herein to describe any increase in the size and/or volume of one or more voids of a carbonaceous material (such as coal) during pretreatment, as determined by measuring, assessing, and/or quantifying via Barret-Joymer-Halenda (BJH) adsorption and desorption measurements (using nitrogen at 77K) the increase in average void width and/or cumulative volume of voids of a dried carbonaceous material (that has been subjected to drying conditions at 120° C. at atmospheric pressure under nitrogen atmosphere for 24 hours, until no change in sample weight is detected) that occurs when a mixture of the dried carbonaceous material and tetralin is heated at 150° C. for 2 hours under ambient pressure, followed by filtration under the same temperature.

Swelling of a carbonaceous material such as coal (or any portion of carbonaceous material, such as any void contained on or in the carbonaceous material) may be evident by any increase in size (including volume, surface area and/or mass), and/or any changes in shape or chemical or physical structure, such as in response to heat, chemical treatment (such as contact with one or more chemicals), and/or as a result of uptake of one or more materials. For example, swelling may be evident by any increase in the overall size of particles of a carbonaceous material, any increase in the size, and/or number of voids in or on a carbonaceous material (such as the pore size, pore distribution, and/or total porosity of carbonaceous material particles) any change in the shape of the voids in or on a carbonaceous material, and/or any change in the chemical and/or structural changes that occurs during and/or subsequent to heating of the carbonaceous material and/or contacting of the carbonaceous material with one or more chemicals. Swelling may also be evident by any change(s) that occur in the primary, secondary, and/or tertiary structure of a carbonaceous material, such as due to altering, changing, increasing and/or decreasing the strength and/or existence of any one or more chemical bonds (e.g., covalent bonds, ionic bonds, ionic interactions, hydrogen bonds, cross-links, or interactions due to intermolecular forces, dipole interactions, London dispersion forces and the like) within the carbonaceous material. Swelling can also be evident by any increase in the size of one or more voids of a carbonaceous material that is detectable using any known method, such as, for example, by measuring adsorption isotherms, pore volume, and/or solvent uptake. For example, swelling can be evident by any increase in void size that is detectable using dynamic gravimetric swelling capacity (e.g., determination of the ratio of the mass of dry, non-swollen carbonaceous material to the mass of carbonaceous material after swelling); volumetric equilibrium swelling ratio (e.g., determination of the ratio of the volume of dry, non-swollen carbonaceous material to swollen carbonaceous material at equilibrium with a swelling solvent); through characterization of the equilibrium swelling ratio (e.g., determination of the ratio of the mass of dry, non-swollen carbonaceous material to swollen carbonaceous material after equilibration, corrected for the mass of the solvent which fills the pores of the carbonaceous material and does not contribute to the swelling), and/or by characterization of the swelling ratio [h2/h1] of the carbonaceous material, by comparing the height [h1] of dry carbonaceous material (such as in a 8 mm OD Pyrex tube) after centrifugation (such as at 1725 rpm for 5 minutes) with the height of the same carbonaceous material following vigorous shaking, re-wetting (e.g., with 3-4 ml of hydrocarbonaceous liquid), and re-centrifuging, wherein the shaking, re-wetting, and re-centrifugation steps are repeated until a constant height [h2] is obtained.

Alternatively, or in addition, swelling can be evident by any increase in void size of a carbonaceous material that is detectable using any suitable adsorption analyzer, such as a Micromeritics ASAP 2000 instrument. In this regard, measurement of void (such as micropore) volume can be derived from the adsorption volume of voids (or pores) having a diameter in the range from about 4 angstroms to about 20 angstroms. Likewise, measurement of mesopore volume can be derived from the adsorption volume of pores having a diameter in the range from greater than about 20 angstroms to about 500 angstroms. For example, a qualitative identification of the type of porosity, for example, microporous or macroporous can be made from the shape of the adsorption isotherm. Additionally, swelling can be evident by any increase in void size of a carbonaceous material that is detectable through determination of increased porosity, which can be correlated with increased surface area. In this regard, void (or pore) diameter can be calculated from the data using equations described by Charles N. Satterfield in *Heteroge-* neous *Catalysis*, McGraw-Hill Book Company, New York, 1980, pp. 106-114, incorporated in its entirety herein by reference.

The term "hydroconversion," and its grammatical equivalents, is used herein to describe the hydroprocessing (such as cracking, hydrocracking, liquefaction, hydrofinishing, and/or hydrotreating, such as hydrodesulpurization, dydrodenitrification, hydrodemetalization, and/or hydrodeoxygenation) of a carbonaceous material in the presence of hydroconverting or hydroprocessing catalyst(s) to effect conversion of at least a portion of the carbonaceous material to lower molecular weight hydrocarbons and/or to effect the removal of unwanted components, or compounds, or their conversion to innocuous or less undesirable compounds.

The term "conversion," and its grammatical equivalents, is used herein to describe hydroconversion (as measured on a dry ash-free basis ("d.a.f.") unless otherwise specified) of solid carbonaceous material into organic gases and liquids, as calculated on a weight basis, for example, by the following equation: 100%×(d.a.f. carbonaceous material−residual toluene insoluble solids)/d.a.f. carbonaceous material.

The term "Group IIB metal" is used herein to refer to any one or more of: zinc, cadmium, mercury, and element 112. The term "Group IIIB metal" is used herein to refer to any one or more of: scandium, yttrium, lanthanum, and actinium. The term "Group IVA metal" is used herein to refer to any one or more of: germanium, tin, and lead. The term "Group IVB metal" is used herein to refer to any one or more of: titanium, zirconium, hafnium, and rutherfordium. The term "Group VB metal" is used herein to refer to any one or more of: vanadium, niobium, tantalum, and dubnium. The term "Group VIB metal" is used herein to refer to any one or more of: chromium, molybdenum, tungsten, and seaborgium. The term "Group VIIB metal" is used herein to refer to any one or more of: manganese, technetium, rhenium, and bohrium. The term "Group VIII metal" is used herein to refer any noble or non-noble Group VIII metal, including any one or more of: iron, ruthenium, osmium, hassium, cobalt, rhodium, iridium, meitnerium, nickel, palladium, platinum, and element 110.

The term "catalyst precursor" is used herein to refer to a compound that is transformable into a catalyst via chemical reaction with one or more reagents (such as sulfiding and/or reducing agents, e.g., hydrogen, such as within a hydrocarbon medium) and/or via any other suitable treatment (such as thermal treatment, multi-step thermal treatment, pressure treatment, or any combination thereof) whereby the catalyst precursor at least partially decomposes into a catalyst.

Several embodiments of the invention, including the above aspects of the invention, are described in further detail as follows. Generally, each of these embodiments can be used in various and specific combinations, and with other aspects and embodiments unless otherwise stated herein.

Pretreatment Process

The present invention is related to a system and method for pretreating a carbonaceous material, for dispersing one or more catalysts or catalyst precursors into a carbonaceous material, for enhancing the conversion of a carbonaceous material (such as a naturally-occurring solid carbonaceous material, such as coal) to a liquid and/or gaseous product, for producing a carbonaceous material of enhanced reactivity, for improving efficiency of carbonaceous material (such as coal) liquefaction, as measured for example by conversion and liquid yield, and/or for lowering hydrogen consumption during liquefaction of carbonaceous material. The present invention also relates to improved feeds for hydroconversion processes, as well as to liquid and/or gaseous products prepared by the systems and methods described herein.

In one embodiment, such pretreating of a carbonaceous material is performed or accomplished using reaction conditions (or a combination of conditions, such as temperature, pressure, and/or duration of pretreatment) at which substantially no hydroconversion of the carbonaceous material occurs (i.e., wherein less than about 30%, e.g., less than about 25%, less than about 20%, less than about 15%, less than about 10%, less than about 5%, less than about 1%, less than about 0.5%, less than about 0.1%, or even less than about 0.01% hydroconversion of the carbonaceous material occurs) during the pretreatment step. In one embodiment, such pretreating of a carbonaceous material is performed or accomplished using reaction conditions (or a combination of conditions, such as temperature, pressure, and/or duration of pretreatment) at which no measurable hydroconversion of the carbonaceous material occurs (i.e., wherein less than about 30%, less than about 25%, less than about 20%, less than about 15%, less than about 10%, less than about 5%, less than about 1%, less than about 0.5%, less than about 0.1%, or even less than about 0.01% hydroconversion of the carbonaceous material occurs) during the pretreatment step. Alternatively, or in addition, the pretreating is performed using conditions at which at least a substantial portion (or all) of the one or more catalysts exhibit and/or possess minimal, substantially no, or no catalytic, hydrotreating, hydroconverting, and/or liquefying activity, and/or such that an insubstantial amount (wherein less than about 30 wt. %, less than about 25 wt. %, less than about 20 wt. %, less than about 15 wt. %, less than about 10 wt. %, less than about 5 wt. %, less than about 1 wt. %, less than about 0.5 wt. %, less than about 0.1 wt. %, or even less than about 0.01 wt. %) of the bulk catalyst or bulk catalyst precursor exhibits and/or possesses catalytic, hydrotreating, hydroconverting, and/or liquefying activity.

The pretreatment composition comprising the carbonaceous material, one or more catalyst or catalyst precursors, and hydrocarbonaceous liquid can be prepared in any suitable manner. In one embodiment, the carbonaceous material, catalyst or catalyst precursor, and hydrocarbonaceous liquid are simply mixed to form a pretreatment composition, and the pretreatment composition is subjected to pretreatment conditions. In another embodiment, the carbonaceous material is contacted with the catalyst or catalyst precursor in the presence of the hydrocarbonaceous liquid, and the pretreatment composition is subjected to pretreatment conditions. In another embodiment, the carbonaceous material is ground in the presence of the one or more catalysts or catalyst precursors and the hydrocarbonaceous liquid, to produce a pretreatment composition in the form of a slurry; and the pretreatment composition is subjected to pretreatment conditions. In another embodiment, the carbonaceous material is ground in the presence of the hydrocarbonaceous liquid to produce a slurry; the one or more catalysts or catalyst precursors are added to the slurry to form a pretreatment composition; and the pretreatment composition is subjected to pretreatment conditions. In other embodiment, the catalyst or catalyst precursor is added at the start of the pretreatment process. In another embodiment, the catalyst or catalyst precursor is added at intervals throughout a pretreatment process.

Any suitable process or operating conditions can be utilized to pretreat the carbonaceous material. In one embodiment, the pretreatment composition is heated to a temperature sufficient to cause one or more catalysts or catalyst precursors to disperse into the carbonaceous material, and is maintained, held, and/or kept at this pretreatment temperature for a time or duration sufficient to disperse one or more of the catalysts or catalyst precursors into the carbonaceous material to a desired degree of dispersion, integration, and/or homogeneity.

In one embodiment, the pretreatment composition is heated at a sufficient temperature for a sufficient time or duration to at least partially, substantially, or fully disperse the catalyst or catalyst precursor into the carbonaceous material. In this regard, the temperature used for pretreating the carbonaceous material can be any temperature that is lower than the temperature required to activate at least a portion (such as a substantial portion, or all) of the catalysts or catalyst precursors, any temperature that is lower than the temperature required for hydroconversion of carbonaceous material, any temperature that is lower than the temperature required for thermal cracking of carbonaceous material, any temperature sufficient to cause swelling of the carbonaceous material, any temperature sufficient to increase the void size, void distribution, and/or total volume of voids of the carbonaceous material, any temperature sufficient to increase hydrocarbonaceous liquid and/or catalyst and/or catalyst precursor dispersion into the carbonaceous material (such as voids of the carbonaceous material), any temperature sufficient to generate a more reactive carbonaceous material for liquefaction, and/or any temperature sufficient to improve, increase, enhance, and/or facilitate dispersion of the catalyst or catalyst precursor into and/or throughout the carbonaceous material. In one embodiment, the pretreatment composition is heated to a temperature of about 100-350° C. (such as about 100-300° C., about 110-340° C., about 120-320° C., about 140-300° C., about 150-280° C., about 160-260° C., about 170-240° C., about 180-220° C., or even about 190-210° C.). In another embodiment, the pretreatment composition is heated to a temperature less than about 350° C., about 325° C., about 300° C., about 290° C., about 280° C., about 270° C., about 260° C., about 250° C., about 240° C., about 230° C., about 220° C., about 210° C., about 200° C., about 190° C., about 180° C., about 170° C., or even less than about 160° C. In one embodiment, the pretreatment composition is heated to a temperature of about 180-220° C.

The pretreatment composition is preferably maintained, kept, and/or held at the pretreatment temperature for a time or duration sufficient to cause swelling of the carbonaceous material and to allow for dispersion (such as complete dispersion and/or homogenous dispersion) of the catalyst or catalyst precursor into the carbonaceous material. In one embodiment, for example, the pretreatment composition is maintained, kept, and/or held at suitable temperature for a suitable duration to cause the total volume of voids of the carbonaceous material (or of each particle of carbonaceous material) to increase by greater than about 5%, about 10%, about 15%, about 20%, about 25%, about 30%, about 35%, about 40%, about 45%, about 50%, about 75%, about 100%, about 150%, about 200%, about 250%, or even about 300%, such as at 400%, as compared to the carbonaceous material prior to pretreatment. In one embodiment, in this regard, the pretreatment composition is maintained at the pretreatment temperature for a time of about 5-600 minutes, about 10-540 minutes, about 15-480 minutes, about 20-420 minutes, about 10-360 minutes, about 30-360 minutes, about 40-300 minutes, about 50-240 minutes, or even about 60-180 (such as, for example, about 30-120 minutes, or even about 40-100 minutes). In another embodiment, the pretreatment composition is maintained at the pretreatment temperature for a time greater than about 5 minutes, about 10 minutes, about 15 minutes, about 30 minutes, about 45 minutes, about 60 minutes, about 75 minutes, about 90 minutes, about 120 minutes, about 180 minutes, about 240 minutes, about 300 minutes, about 360 minutes, about 420 minutes, about 480 minutes, about 540 minutes, or even greater than about 600 minutes.

In one embodiment, the pretreatment composition is heated to a temperature of about 100-350° C. (such as about 100-300° C., about 110-340° C., about 120-320° C., about 140-300° C., about 150-280° C., about 160-260° C., about 170-240° C., about 180-220° C., or even about 190-210° C.) and maintained at that temperature for about 5-600 minutes, about 10-540 minutes, about 15-480 minutes, about 20-420 minutes, about 10-360 minutes, about 30-360 minutes, about 40-300 minutes, about 50-240 minutes, or even about 60-180 (such as, for example, about 30-120 minutes, or even about 40-100 minutes). In another embodiment, the pretreatment composition is heated to a temperature less than about 350° C. (such as less than about 325° C., about 300° C., about 290° C., about 280° C., about 270° C., about 260° C., about 250° C., about 240° C., about 230° C., about 220° C., about 210° C., about 200° C., about 190° C., about 180° C., about 170° C., or even less than about 160° C.) and maintained at that temperature for about 5-600 minutes, about 10-540 minutes, about 15-480 minutes, about 20-420 minutes, about 10-360 minutes, about 30-360 minutes, about 40-300 minutes, about 50-240 minutes, or even about 60-180 (such as, for example, about 30-120 minutes, or even about 40-100 minutes).

Pretreatment of the carbonaceous material can be performed under any suitable atmosphere. In one embodiment, the pretreatment of carbonaceous material occurs under an inert atmosphere. In another embodiment, the pretreatment occurs under a reducing atmosphere, such as under hydrogen and/or a synthesis gas ("syn-gas") pressure. In some embodiments, for example, the pretreatment is performed at a pressure between atmospheric pressure and about 500 psig, e.g., a pressure of about 100-450 psig, about 150-400 psig, about 200-350 psig, such as a pressure less than about 500 psig, less than about 450 psig, less than about 400 psig, less than about 350 psig, about 300 psig, about 250 psig, or even less than about 200 psig. In other embodiments, the pretreatment occurs under a reducing atmosphere at a pressure defined by the hydroconversion process, such as at a pressure of about 300-5000 psig, such as about 300-4800 psig, about 300-4600 psig, about 300-4400 psig, about 300-4200 psig, about 400-4000 psig, about 500-3500 psig, about 1000-3000 psig, 1200-2800 psig, 1400-2600 psig, or even about 1500-2600. Any suitable syn-gas can be used in this regard, such as, for example, a syn-gas that comprises a 1:1 to 2:1 mixture of hydrogen with carbon monoxide, and optionally also contains carbon dioxide, methane, and/or other components.

The pretreatment can achieve or accomplish any desired degree of dispersion of catalyst or catalyst precursor into the carbonaceous material. In one embodiment, the pretreatment of carbonaceous material produces a carbonaceous material comprising at least partial, substantial, or complete dispersion, penetration, and/or integration of catalyst or catalyst precursor. In one embodiment, the pretreatment produces a carbonaceous material, wherein greater than about 40 wt. % (such as greater than about 50 wt. %, about 60 wt. %, about 70 wt. %, about 80 wt. %, about 90 wt. %, about 95 wt. %, about 96 wt. %, about 97 wt. %, about 98 wt. %, or even about 99 wt. %) of the voids present within the carbonaceous material prior to pretreatment are at least partially occupied by the catalyst or catalyst precursor. In other embodiments, following pretreatment, greater than about 40 wt. % (such as greater than about 45 wt. %, about 50 wt. %, about 55 wt. %, about 60 wt. %, 65 wt. %, about 70 wt. %, about 75 wt. %, about 80 wt. %, about 85 wt. %, about 90 wt. %, or even greater than about 95 wt. %) of the catalyst or catalyst precursor used within the pretreatment system or process is contained within the carbonaceous material.

In some embodiments, the pretreatment causes an increase of at least about 5% (such as at least about 10%, about 15%, about 20%, about 25%, about 30%, about 35%, about 40%, about 45%, or even an increase of at least about 50%) in the weight of a carbonaceous material, as measured by solvent uptake (described in the Examples). In other embodiments, the pretreatment causes solvent uptake of at least about 5% (such as at least about 10%, about 15%, about 20%, about 25%, about 30%, about 35%, about 40%, about 45%, or even at least about 50%).

Following pretreatment of the carbonaceous material, the carbonaceous material and dispersed catalyst or catalyst precursor, optionally together with the hydrocarbonaceous liquid, form an improved feed for a hydroconversion process. Such an improved feed can be used for any suitable hydroconversion process to produce a liquid and/or gaseous product.

Carbonaceous Material

The carbonaceous material can be any suitable solid carbon containing material, such as any naturally occurring solid, or normally solid, carbon containing material. Specifically, for example, the carbonaceous material can be coal, such as anthracite, bituminous coal, sub-bituminous coal, lignite, or any combination or mixture thereof. The carbonaceous material can also be any heteroatom-containing solid carbonaceous material or feed, as well as any heavy hydrocarbonaceous feeds, such as, for example, coal, coke, peat, and/or a similar material, such as any solid carbonaceous material containing a relatively high ratio of carbon to hydrogen, or combinations or mixtures thereof. In one embodiment, the carbonaceous material is coal, non-limiting examples of which include anthracite, bituminous coal, sub-bituminous coal, lignite, or combinations or mixtures thereof.

In some embodiments, at least a portion of the carbonaceous material is in the form of particles, or finely divided particles, having any suitable size. For example, at least a portion of the carbonaceous material (such as, for example, greater than about 40 wt. %, about 50 wt. %, about 60 wt. %, about 70 wt. %, about 75 wt. %, about 80 wt. %, about 85 wt. %, about 90 wt. %, or even greater than about 95 wt. % of the carbonaceous material) can be in the form of particles having a mean particle diameter of less than about 0.50 inches, about 0.45 inches, about 0.40 inches, about 0.35 inches, about 0.30 inches, about 0.25 inches, about 0.20 inches, about 0.15 inches, about 0.10 inches, about 0.05 inches, or even about 0.025 inches. In other embodiments, at least a portion of the carbonaceous material (such as, for example, greater than about 40 wt. %, about 50 wt. %, about 60 wt. %, about 70 wt. %, about 75 wt. %, about 80 wt. %, about 85 wt. %, about 90 wt. %, or even greater than about 95 wt. % of the carbonaceous material) is in the form of particles having a mean particle diameter of about 0.025-0.50 inches, about 0.05-0.45 inches, about 0.10-0.40 inches, about 0.15-0.35 inches, or even about 0.20-0.30 inches. In other embodiments, at least a portion of the carbonaceous material (such as, for example, greater than about 40 wt. %, about 50 wt. %, about 60 wt. %, about 70 wt. %, about 75 wt. %, about 80 wt. %, about 85 wt. %, about 90 wt. %, or even greater than about 95 wt. % of the carbonaceous material) is in the form of particles having a size of about 1-300 mesh (National Bureau of Standards (NBS) sieve size), such as about 1-250 mesh, about 5-200 mesh, about 10-150 mesh, about 20-125 mesh, about 30-100 mesh, or even about 40-90 mesh (such as less than about 300 mesh, about 275 mesh, about 225 mesh, about 175 mesh, about 135 mesh, about 115 mesh, about 95 mesh, about 85 mesh, about 65 mesh, about 45 mesh, about 25 mesh, or even less than about 15 mesh). In one embodiment, greater than about 80 wt. % of the carbonaceous material is in the form of particles having a mean diameter less than about 0.25 inches.

Such particles can be formed in any suitable manner, such as by grinding at least a portion of the carbonaceous material. In one embodiment, at least a portion of the carbonaceous material is ground in the presence of one or more catalysts or catalyst precursors and the hydrocarbonaceous liquid. In another embodiment, at least a portion of the carbonaceous material is ground in the presence of the hydrocarbonaceous liquid to form a slurry, and (such as subsequently) mixing the slurry with one or more catalysts or catalyst precursors. In other embodiments, the carbonaceous material is ground under an inert or a reducing atmosphere, such as, for example, hydrogen, nitrogen, helium, argon, syn-gas, or any combination or mixture thereof. Any method or equipment may be used to grind the carbonaceous material, such as, for example, a hammer mill, a ball mill (such as a wet ball mill, a conical ball mill, a rubber roller mill), a rod mill, or a combination thereof.

Hydrocarbonaceous Liquid

The hydrocarbonaceous liquid can be any suitable liquid (such as solvent or diluent) known in the art to be useful for the liquefaction of carbonaceous materials (such as solid carbonaceous materials, such as coal). In one embodiment, the hydrocarbonaceous liquid is a hydrogen donor solvent, such as any compound(s) which functions as a hydrogen donor in hydroconversion conditions.

In one embodiment, the hydrocarbonaceous liquid comprises a coal-derived solvent, such as an in-line hydro-treated coal-derived solvent or a distillate fraction thereof.

In another embodiment, the hydrocarbonaceous liquid comprises a hydrogenated aromatic, a napthenic hydrocarbon, a phenolic material, or a similar compound, or a combination or mixture thereof.

In another embodiment, the hydrocarbonaceous liquid comprises one or more aromatics, such as one or more alkyl substituted aromatics. In another embodiment, the hydrocarbonaceous liquid comprises one or more aromatics comprising one or more of biphenyl, alkyl substituted biphenyl, naphthalene, hydronaphthalene, alkyl substituted naphthalene, alkyl substituted hydronaphthalene, anthracene, hydroanthracene, alkyl substituted anthracene, alkyl substituted hydroanthracene, phenanthrene, hydrophenanthrene, alkyl substituted phenanthrene, alkyl substituted hydrophenanthrene, fluorene, hydrofluorene, alkyl substituted fluorene and alkyl substituted hydrofluroene, pyrene, hydropyrene, alkyl substituted pyrene, alkyl substituted hydropyrene having 1-10 carbon atoms in the alkyl substitution, or a combination or mixture thereof. In another embodiment, the hydrocarbonaceous liquid comprises one or more phenolics comprising one or more of phenol, alkyl substituted phenol, naphthanol, alkyl substituted naphthanol, indanol, alkyl substituted indanol, or a combination or mixture thereof.

In another embodiment, the hydrocarbonaceous liquid is a solvent derived from a liquefaction or hydroconversion process; a hydrogenated creosote oil; a hydrogenated intermediate product stream from catalytic cracking of petroleum feedstocks; a coal-derived liquid that is rich in indane, decalins, biphenyls, methylnaphthalene, dimethylnaphthalene, $C_{12}$-$C_{13}$ acenaphthenes, and tetrahydroacenaphthene, or a combination or mixture thereof.

In one embodiment, the hydrocarbonaceous liquid is derived from the carbonaceous material being pretreated or from a liquid product of the liquefaction or hydroconversion process. For example, the hydrocarbonaceous liquid can be any liquefaction or hydroconversion product stream fraction boiling at, for example, a temperature of about 350-1000° F., such as about 400-950° F., about 450-900° F., about 500-850° F., about 550-850° F., or even about 650-850° F. as is or after a hydrotreatment, to enhance hydrogen donor ability. In another embodiment, the hydrocarbonaceous liquid is a liquefaction or hydroconversion product stream fraction boiling at a temperature greater than about 300° F., greater than about 350° F., greater than about 400° F., greater than about 450° F., greater than about 500° F., greater than about 550° F., greater than about 600° F., greater than about 650° F., greater than about 700° F., greater than about 750° F., greater than about 800° F., greater than about 850° F., greater than about 900° F., or even greater than about 950° F. In one embodiment, the hydrocarbonaceous liquid is a fluid catalytic cracking (FCC) type process oil cut that boils at a temperature of about 500° F. or higher ("FCC-type process oil (500° F.+cut)"). In another embodiment, the hydrocarbonaceous liquid is an FCC-type process oil boiling at a temperature of about 500° F. or less ("FCC-type process oil (500° F.−cut)"). In another embodiment, the hydrocarbonaceous liquid is a hydrotreated FCC oil. In another embodiment, the hydrocarbonaceous liquid is tetralin (1,2,3,4-Tetrahydronaphthalene). In another embodiment, the hydrocarbonaceous liquid comprises one or more compounds that have an atmospheric boiling point ranging from about 350-850° F.

The hydrocarbonaceous liquid can have any suitable aromatic content, such as, for example, an aromatic content of at least about 30 wt. %, at least about 35 wt. %, at least about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, or even about 95 wt. % (such as an aromatic content of about 30-95 wt. %, about 35-90 wt. %, about 40-85 wt. %, about 45-80 wt. %, or about 50-75 wt. %).

The hydrocarbonaceous liquid can have any suitable hydrogen donatability, such as, for example, a hydrogen donatability greater than about 0.5%, about 1.0%, about 1.5%, about 2%, about 3%, about 4%, or even about 5%, as determined, for example, by $^1$H NMR. In one embodiment, for example, the hydrocarbonaceous liquid is octahydroanthracene, which has a hydrogen donatability of about 4.3%.

Any suitable concentration of one or more hydrocarbonaceous liquids can be used in the context of the present invention. In one embodiment, for example, the hydrocarbonaceous liquid is present in the pretreatment process at a concentration of about 5-70 wt. %, 10-60 wt. %, about 20-50 wt. %, or about 30-40 wt. %. In this regard, any suitable ratio of hydrocarbonaceous liquid to carbonaceous material (such as carbonaceous particles, or even coal particles) can be used in the context of the present invention, such as, for example, a ratio in a range of about 1:10 to about 10:1, such as a range of about 1:8 to about 8:1, a range of about 1:6 to about 6:1, a range of about 1:4 to about 5:1, a range of about 1:2 to about 5:1, a range of about 1:2 to about 4:1, a range of about 1:2 to about 3:1, a range of about 1:2 to about 2:1, or even a range of about 1:2 to about 1:1, by weight of the mixture. In one embodiment, the ratio of hydrocarbonaceous liquid to carbonaceous material used in the pretreatment process is about 0.75:1 to about 1:1.

Catalyst Precursor

The catalyst precursor can be any suitable catalyst precursor that, when transformed into a catalyst, is suitable for use in hydroconverting a carbonaceous material (such as coal). In this regard, the catalyst precursor can be any suitable hydroconversion catalyst precursor. Additionally, the catalyst precursor can be any an oil-soluble or oil-dispersible catalyst precursor, such as any oil-soluble or oil-dispersible metal-containing catalyst precursor. The catalyst precursor can also be any catalyst precursor that is soluble in a hydrocarbonaceous liquid or oil, any catalyst precursor that is soluble in a liquid organic medium that can be dispersed in a hydrocarbonaceous liquid or oil, and/or any catalyst precursor that is water soluble and oil-dispersible (such as any catalyst precursor that is in an aqueous solution that is dispersible in a hydrocarbonaceous liquid or medium). In other embodiments, the catalyst precursor is a heterogeneous catalyst precursor (such as a metal-containing heterogeneous catalyst precursor). In one embodiment, the catalyst precursor is a metal-containing, oil-dispersible catalyst precursor that is transformable to a catalyst. Suitable oil-soluble catalyst precursors include:

(1) metal-containing inorganic compounds such as metal-containing sulfides, oxysulfides, hydrated oxides, ammonium salts such as ammonium dimolybdate, heteropoly acids (such as phosphomolybdic acid, molybdosilisic acid, or a combination or mixture thereof);

(2) metal salts of organic acids such as (i) acyclic and alicyclic aliphatic carboxylic acids containing two or more carbon atoms (such as naphthenic acids), (ii) aromatic carboxylic acids (such as toluic acid), (iii) sulfonic acids (such as toluenesulfonic acid), (iv) sulfinic aids, (v) mercaptans, (vi) xanthic acid, (vii) phenols, (viii) di and polyhydroxy aromatic compounds, or a combination or mixture thereof;

(3) metal-containing organometallic compounds including metal-containing chelates such as 1,3-diketones, ethylene diamine, ethylene diamine tetraacetic acid, phthalocyanines, thiocarbamates, and combinations or mixtures thereof; and/or (4) metal salts of organic amines such as aliphatic amines, aromatic amines, quaternary ammonium compounds, or combinations or mixtures thereof.

The catalyst precursor can also be any suitable soluble organophosphorodithioate catalyst, such as, for example, molybdenum, oxymolybdenum, sulfurized oxymolybdenum compounds containing one or more organophosphorodithioate groups, or a combination or mixture thereof.

The catalyst precursor can comprise any suitable metal, such as, for example, a metal selected from the group consisting of Group IIB metals, Group IIIB metals, Group IVA metals, Group IVB metals, Group VB metals, Group VIB metals, Group VIIB metals, Group VIII metals, or a combination or mixture thereof, such as in combination with one or more of oxygen, sulfur, nitrogen, and phosphorous. In one embodiment, the catalyst precursor comprises a Group VIII metal, a Group VIB metal (such as molybdenum), or a combination or mixture thereof. In another embodiment, the catalyst precursor comprises a metal selected from the group consisting of molybdenum, tungsten, vanadium, chromium, cobalt, titanium, iron, nickel, and combinations and mixtures thereof. The catalyst precursor, in some embodiments, can comprise any suitable metal salt or metallic salt, such as any metal or metallic salt(s) of acyclic (straight or branch chained) aliphatic carboxylic acids, salt(s) of cyclic aliphatic carboxylic acids, polyacids, carbonyls, phenolares, organoamine salts, or combinations or mixtures thereof.

In one embodiment, the catalyst precursor comprises oil soluble and/or highly dispersible molybdenum complexes, or any related complex of molybdenum with dithiocarbamate, dithiophosphate, xanthates, and/or thioxanthate ligands, or a combination or mixture thereof.

In another embodiment, the catalyst precursor is an oil dispersible metal catalyst precursor as described in U.S. Pat.

No. 4,295,995, the contents of which are incorporated herein by reference in their entirety. In particular, for example, the catalyst precursor can be any suitable alicyclic, aliphatic, and/or cyclic carboxylic acid, such as a metal naphthenate and inorganic polyacids of one or more metals selected from Group VB metals and Group VIB metals (such as vanadium, niobium, chromium, molybdenum and tungsten), or a combination or mixture thereof. Suitable inorganic polyacids include, for example, phosphomolybdic acid, phosphotungstic acid, phosphovanadic acid, silicomolybdic acid, silicotungstic acid, silicovanadic acid, and combinations and mixtures thereof. In one embodiment, the catalyst precursor is a polyacid such as phosphomolybdic acid. The terms "heteropolyacids" and "isopolyacids" are used in accordance with the definitions given in Advanced Inorganic Chemistry, 4th Edition, S. A. Cotton and Geoffrey Wilkinson, Interscience Publishers, N.Y., pages 852-861, the contents of which are incorporated herein in their entirety.

Although Mo may be used alone as the metal component of the catalyst precursor, it can also be promoted with certain metals upon transformation of the catalyst precursor such as during upgrading operations such as hydrotreating and hydrocracking. Such metals include W, Ni, Co, Cu, Pt, Pd and Sn. Upon transformation of the catalyst precursor to catalyst, these metals have been found to have a promoting effect on Mo, increasing liquid yields and cracking selectivity at high active catalyst concentrations as well as reducing the presence of heteroatoms such as S and N.

In one embodiment, the catalyst precursor is a molybdenum sulfur compound such as, for example, ammonium tetrathiomolybdate, dioxobis (n-dibutyldithio-carbamato) $MoO_2$ ("dioxoMoDTC"), molybdenum di-n-butylthiocarbamate (Molyvan A)(available from R.T. Vanderbuilt Co, Inc.), molybdenum 2-ethylhexylphosphorodithioate (Molyvan L)(available from R.T. Vanderbilt Co, Inc.), molybdenum dialkyldithiocarbamate (Molyvan 807, 822, and 2000)(available from R.T. Vanderbuilt Co, Inc.), an organomolybdenum complex (Molyvan 855)(available from R.T. Vanderbuilt Co, Inc.), or combinations or mixtures thereof.

The catalyst precursor can be formed in any suitable manner prior to and/or during the pretreatment process. In one embodiment, for example, one or more catalyst precursors are formed prior to and/or during the pretreatment step (such as in situ) by (i) mixing a hydrocarbonaceous liquid (such as a liquefaction solvent) with a metal-containing compound (such as a metal oxide, e.g., iron oxide, or other compound containing any suitable metal as discussed herein), (ii) combining the mixture with a sulfiding agent (such as by passing hydrogen sulfide through the mixture) in a manner such that the sulfided metal-containing compound is dispersible, (iii) combining the sulfided mixture with a carbonaceous material, and (iv) subjecting the mixture to pretreatment conditions (such as under hydrogen pressure) in a manner such that a colloidal solution of one or more catalyst precursors forms in or on the carbonaceous material.

In another embodiment, one or more catalyst precursors are formed prior to and/or during the pretreatment step (such as in situ) by (i) mixing one or more metal-containing compounds, a sulfiding agent, and water, to form a colloidal suspension, (ii) combining the colloidal suspension with a hydrocarbonaceous liquid (such as a liquefaction solvent) to drive water out of the suspension, (iii) combining the suspension with a carbonaceous material, and (iv) subjecting the suspension to pretreatment conditions (such as under hydrogen pressure), in a manner such that one or more catalyst precursors form in or on the carbonaceous material.

In another embodiment, one or more catalyst precursors are formed prior to and/or during the pretreatment step (such as in situ) by (i) sulfiding an ammonium-containing Group VIB metal compound in an aqueous phase with hydrogen sulfide, in a substantial absence of hydrocarbon oil, at a temperature less than about 177° C., to form a presulfided product; and (ii) separating ammonia from said presulfided product to form a sulfided product, in a manner such that one or more catalyst precursors form in or on the carbonaceous material.

Any suitable amount of the catalyst precursor can be used to pretreat the carbonaceous material in the context of the present invention. In one embodiment, the mixture of catalyst precursor, carbonaceous material, and hydrocarbonaceous liquid comprises about 25-10000 ppm (such as about 50-9000 ppm, about 100-8000 ppm, about 250-5000, about 500-3000 ppm, or even about 1000-2000 ppm) of one or more catalyst precursors by weight, based on the total weight of the mixture.

The catalyst precursor can be used in the context of the present invention in any suitable form, such as, but not limited to, particulate form, impregnated within a carbonaceous material, dispersed in the hydrogen donor solvent, and/or soluble in the hydrogen donor solvent. Additionally, the catalyst precursor may be used in processes employing fixed, moving, and ebullated beds as well as slurry reactors.

Following pretreatment of the carbonaceous material with one or more catalyst precursors, the catalyst precursor(s) can be transformed into a catalyst by thermal decomposition, such as prior to or during liquefaction, without the addition of additional reactants. In other embodiments, following pretreatment, one or more additional reactants can be added to the pretreated carbonaceous material mixture (such as prior to or during the liquefaction process), to transform the dispersed catalyst precursor into a catalyst. Any suitable reactants can be used in this regard, such as for example any suitable sulfiding or reducing agents. Suitable sulfiding agents include, for example, any sulfur compound that is in a readily releasable form, such as, for example, hydrogen sulfide, ammonium sulfide, dimethyldisulfide, ammonium sulfate, carbon disulfide, elemental sulfur, and sulfur-containing hydrocarbons. Elemental sulfur is preferred in some embodiments, because of its low toxicity, low cost, and ease of handling. Additional sulfiding agents include, for example, ammonium sulfide, ammonium polysulfide, ammonium thiosulfate, sodium thiosulfate, thiourea, carbon disulfide, dimethyl disulfide, dimethyl sulfide, tertiary butyl polysulfide, tertiary nonyl polysulfide, and mixtures thereof. In another embodiment, the sulfiding agent is selected from the group consisting of alkali- and/or alkaline earth metal sulfides, alkali- and/or alkaline earth metal hydrogen sulfides, and mixtures thereof.

The sulfiding agent can be added in any suitable form. In one embodiment, elemental sulfur is added to the pretreated carbonaceous material mixture in the form of a sublimed powder or as a concentrated dispersion (such as a commercial flower of sulfur). Allotropic forms of elemental sulfur, such as orthorhomic and monoclinic sulfur, are also suitable for use herein. In one embodiment, the one or more sulfur compounds are in the form of a sublimed powder (flowers of sulfur), a molten sulfur, a sulfur vapor, or a combination or mixture thereof.

The sulfiding agent can be used in any suitable concentration. In one embodiment, a concentration of sulfur is introduced such that the atomic ratio of sulfur to metal in the catalyst precursor is from about 2:1 to about 10:1, such as from about 2:1 to about 8:1, about 2:1 to about 7:1, about 2:1 to about 6:1, about 2:1 about 9:1, about 2:1 to about 8:1, about 2:1 to 7:1, about 3:1 to about 9:1, about 3:1 to about 8:1, about 3:1 to about 7:1 or even about 3:1 to about 6:1.

Catalyst

Any suitable catalyst can be used in place of, or in combination with, the catalyst precursor, in the context of the invention. Alternatively, or in addition, the catalyst can include any catalyst precursor that has been transformed into a catalyst.

The catalyst can be any catalyst that is suitable for use in a hydroconversion process for a carbonaceous material (such as coal) when subjected to and/or when experiencing suitable catalyzing reaction conditions. For example, the catalyst can be any metal-containing catalyst. In particular, for example, the catalyst can comprise any suitable metal, such as, for example, a metal selected from the group consisting of Group IIB metals, Group IIIB metals, Group IVA metals, Group IVB metals, Group VB metals, Group VIB metals, Group VIIB metals, Group VIII metals, or a combination or mixture thereof, such as in combination with one or more of oxygen, sulfur, nitrogen, and phosphorous. The catalyst can also be any suitable hydroconversion catalyst, such as any metal-containing hydroconversion catalysts (such as molybdenum catalysts and iron catalysts), any carbide-containing or carbide-based catalyst, any nitrite-containing or nitrite-based catalyst, any zinc-containing or zinc-based catalyst, and/or any tin-containing or tin-based catalyst, when exposed to suitable reaction conditions and/or activating conditions. Suitable such catalysts also include cobalt molybdate on alumina, nickel on alumina, cobalt molybdate promoted with nickel, and nickel tungstate catalysts, or the like, as described, for example, in U.S. Pat. Nos. 4,824,821 and 5,484,755 and/or in U.S. Patent Publication No. 2006/0054535, the contents of which are incorporated herein by reference in their entirety. Additionally, the catalyst can be any organometallic catalyst, any metal sulfide catalysts, and/or any Vacuum Resid Slurry Hydrocracking (VRSH) catalyst, as described, for example in U.S. patent application Ser. No. 11/931,972, filed on Oct. 31, 2007; U.S. patent application Ser. No. 11/933,085, filed on Oct. 31, 2007; U.S. patent application Ser. No. 10/938,003, filed on Sep. 10, 2004; U.S. patent application Ser. No. 10/938,202, on filed Sep. 10, 2004; U.S. Pat. No. 5,484,755; U.S. Pat. No. 5,094,991; U.S. Pat. No. 4,710,486; and U.S. Pat. No. 4,557,821, the contents of which are incorporated herein by reference in their entirety.

In one embodiment, the catalyst can be a Group VIB metal sulfide slurry catalyst for the hydroprocessing of heavy hydrocarbonaceous oil or residue prepared by a process comprising the steps of: (a) sulfiding a Group VIB metal, ammonia-containing compound in an aqueous phase, in the substantial absence of hydrocarbon oil, with hydrogen sulfide, at a temperature less than about 350° F., to form a presulfided product without substantial loss of ammonia; (b) separating ammonia from said presulfided product to form a sulfided product; and (c) charging said sulfided product into a hydroprocessing reactor zone at a temperature sufficient to convert said sulfided product into a hydroprocessing catalyst; wherein said catalyst is characterized by a pore volume of 10-300 angstroms, a radius pore size of about 0.1-1 cc/g, and a surface area of from about 20-400 m²/g.

In another embodiment, the catalyst can be a catalyst prepared by: (a) mixing (such as at high shear) a Group VIB metal oxide and aqueous ammonia to form a Group VIB metal compound aqueous mixture; (b) sulfiding, in an initial reactor, the aqueous mixture of step (a) with a sulfide source, such as hydrogen sulfide to form a slurry; (c) promoting the slurry with a promoter compound (such as a Group VIII metal compound, e.g., such as a nickel sulfate or a cobalt sulfate); (d) mixing the slurry of step (c) with hydrocarbon oil (such as a VGO) to form Mixture X; (e) combining Mixture X with hydrogen gas in a second reaction zone, under conditions which maintain the water in Mixture X in a liquid phase, thereby forming a catalyst composition admixed with a liquid hydrocarbon; and (f) recovering the catalyst composition.

In another embodiment, the catalyst can be a catalyst prepared by: (a) mixing a molybdenum oxide and aqueous ammonia to form an aqueous molybdenum mixture; (b) sulfiding, in a first reactor zone, the aqueous mixture of step (a) with a sulfide source, such as hydrogen sulfide to form a slurry; (c) promoting the slurry with a promoter compound (such as a Group VIII metal compound); (d) mixing the slurry of step (c) with a first hydrocarbon oil to form and maintain a homogenous slurry designated as Mixture X; (e) combining Mixture X with hydrogen gas and a second hydrocarbon oil in a second reaction zone, the second hydrocarbon oil having a viscosity that is lower than the viscosity of the first hydrocarbon oil, and mixing the combination to maintain a homogenous slurry, thereby forming a catalyst composition admixed with a gaseous hydrocarbon; and (f) recovering the catalyst composition by separation from the gaseous hydrocarbon of step (e).

In another embodiment, the catalyst, as expressed in elemental form, is of the general formula $(M^t)_a(X^u)_b(S^v)_d (C^w)_e(H^x)_f(O^y)_g(N^z)_h$, wherein M represents at least one Group VIB metal (such as Mo, W, etc., or a combination or mixture thereof); wherein X represents a promoter metal, such as a promoter selected from the group consisting of a non-noble Group VIII metal (such as Ni, Co), a Group VIII metal (such as Fe), a Group VIB metal (such as Cr), a Group IVB metal (such as Ti), a Group IIB metal (such as Zn), and combinations and mixtures thereof; wherein S represents sulfur with the value of the subscript d ranging from (a+0.5b) to (5a+2b); wherein C represents carbon with subscript e having a value of 0 to 11 (a+b); wherein H is hydrogen with the value of f ranging from 0 to 7(a+b); wherein O represents oxygen with the value of g ranging from 0 to 5(a+b); wherein N represents nitrogen with h having a value of 0 to 0.5(a+b); and wherein t, u, v, w, x, y, z represent the total charge for each of the components (M, X, S, C, H, O and N, respectively); ta+ub+vd+we+xf+yg+zh=0. The subscripts ratio of b to a has a value of 0 to 5 ($0 \leq b/a \leq 5$). In one embodiment, the catalyst of the formula defined above is in the form of a catalyst slurry in oil, such as prepared by the method defined in U.S. patent application Ser. No. 11/931,972, filed on Oct. 31, 2007.

In one embodiment, a and b each are suitably greater than 0 such that the ratio of a:b is in the range of 1:5 to 10:1. For example, in one embodiment in which b/a has a value of 0.2, a has a value of 5 and b has a value of 1. In this regard, at a b/a ratio of 0.2, the formula $(M^t)_a(X^u)_b(S^v)_d(C^w)_e(H^x)_f(O^y)_g(N^z)_h$ would include compositions ranging from $(M)_5(X)(S)_{5.5}$, including $(M)_5(X)(S)_{5.5}(C)(H)(O)(N)$, to $(M)_5(X)(S)_{27}(C)_{66}(H)_{42}(O)_{30}(N)_3$.

In one embodiment, M comprises at least one or at least two metals selected from chromium, molybdenum, tungsten, or a combination thereof. In another embodiment, M is selected from molybdenum, tungsten, or a combination thereof. In one embodiment, M is molybdenum.

In one embodiment where both molybdenum and tungsten are used, the catalyst is of the formula $(Mo_zW_{1-z})_a(X)_b(S)_d (C)_e(H)_f(O)_g(N)_h$, where $0<z<1$. In another embodiment where M is a mixture of Mo and W, the molybdenum to tungsten ratio is in the range of 9:1-1:9.

In one embodiment, X comprises at least one or at least two non-noble metals selected from nickel, cobalt, iron, or a combination thereof. In one embodiment, X is nickel. In another embodiment, where X is a mixture of two metals such as Ni and Co, the catalyst is of the formula $(M)_a(Ni_zCo_{1-z})_b(S)_d(C)_e(H)_f(O)_g(N)_h$, where $0<z<1$. In another embodiment where X is a mixture of multiple metals such as Ni, Co, Fe, Zn, Cr, Ti, the catalyst is of the formula:

where $0\leq z,z',z'',z^*,z^{*'}, z^{*''}$ and $(z+z'+z''+z^*+z^{*'}+z^{*''})=1$.

In the remainder of this "catalyst" section of the specification, any reference to "molybdenum" is by way of exemplification only for component (M) in the formula $(M^r)_a(X^u)_b(S^v)_d(C^w)_e(H^x)_f(O^y)_g(N^z)_h$, and is not intended to exclude other Group VIB metals/compounds and mixtures of Group VIB metal/compounds represented by (M) in the catalyst formula. Similarly, any reference in this "catalyst" section of the specification to "nickel" is by way of exemplification only for the component (X) in the formula $(M^r)_a(X^u)_b(S^v)_d(C^w)_e(H^x)_f(O^y)_g(N^z)_h$, and is not meant to exclude other Promoter Metals, such as, for example, Group VIII metals, Group VIB metals, Group IVB metals, Group IIB metals, or combinations or mixtures thereof. Additionally, any discussion in this "catalyst" section of the specification of the reagents that can be used in the manufacture $(M^r)_a(X^u)_b(S^v)_d(C^w)_e(H^x)_f(O^y)_g(N^z)_h$, should be understood to refer to any raw material that can be used in the manufacture of the catalyst. Additionally, any use in this "catalyst" section of the specification of the term "metal" in reference to a reagent should be understood to mean that the reagent is present as a metal compound, and not necessarily that the reagent is in the metallic form. Additionally, any use in this "catalyst" section of the specification of the term "in the solute state" should be understood in this section of the specification to mean that the metal component is in a protic liquid form.

Group VIB Transition Metal Catalyst Precursor: In one embodiment, the catalyst is prepared from catalyst precursor comprising a Group VIB transition metal (M), at least part of which exists in a solid state. In another embodiment, the catalyst is prepared from a catalyst precursor comprising a Group VIB transition metal (M), at least part of which exists in a solute state. In one embodiment, the catalyst is prepared using a catalyst precursor having a molar ratio of Group VIB metal to Promoter Metal in the range of 9:1-1:9 (such as a molar ratio in the range of 3:1 to 1:3).

In one embodiment, the catalyst is prepared using a catalyst precursor comprising a metal (M) that comprises molybdenum and/or tungsten components, such as alkali metal or ammonium metallates of molybdenum (e.g., ammonium molybdate or iso-, peroxo-, di-, tri-, tetra-, hepta-, octa-, or tetradecamolybdate), ammonium salts of phosphomolybdic acids, Mo—P heteropolyanion compounds, Wo—Si heteropolyanion compounds, W—P heteropolyanion compounds. W—Si heteropolyanion compounds, Ni—Mo—W heteropolyanion compounds, Co—Mo—W heteropolyanion compounds, alkali metal or ammonium tungstates (such as meta-, para-, hexa-, or polytungstate), or combinations or mixtures thereof, such as in the solute state (e.g., water-soluble molybdenum and tungsten compounds).

In one embodiment, the catalyst is prepared using a catalyst precursor comprising a (M) metal that comprises an alkali metal or ammonium metallate of molybdenum in an organic solvent such as a normal alkane, hydrocarbon, or petroleum product such as a distillate fraction, e.g., wherein the molybdenum compound is allowed to subsequently decompose under pressure and temperature prior to, or concurrent with, the addition of a Promoter Metal-containing catalyst precursor.

In another embodiment, the catalyst is prepared using a catalyst precursor comprising one or more of: alkali metal heptamolybdates, alkali metal orthomolybdates, alkali metal isomolybdates, and phosphomolybdic acid. In another embodiment, the catalyst is prepared using a catalyst precursor selected from the group consisting of molybdenum (di- and tri) oxide, molybdenum carbide, molybdenum nitride, aluminum molybdate, molybdic acid (e.g., $H_2MoO_4$), and combinations and mixtures thereof.

In one embodiment, the catalyst is prepared using a catalyst precursor that comprises a water-soluble ammonium heptamolybdate $[(NH_4)_6Mo_7O_{24}*4H_2O]$. In another embodiment, the catalyst is prepared using a catalyst precursor that comprises ammonium thiomolybdate. In yet another embodiment, the catalyst is prepared using a catalyst precursor that comprises a polyalkyl thiomolybdate.

Promoter Metal Catalyst Precursor: In one embodiment, the catalyst is prepared using a catalyst precursor that comprises a promoter metal (X) that is in a solute state, wherein the whole amount of the catalyst precursor is in a protic liquid form, and wherein the metal is at least partly present as a solid and partly dissolved in the protic liquid.

In one embodiment, the catalyst is prepared using a catalyst precursor comprising an (X) metal that comprises a metal salt or a mixture of two or more of the following: nitrates, hydrated nitrates, chlorides, hydrated chlorides, sulfates, hydrated sulfates, formates, acetates, hypophosphites, added in a solute state. In another embodiment, the catalyst is prepared using a catalyst precursor comprising an (X) metal that comprises water-soluble nickel and/or cobalt (e.g., cobalt salts), such as nitrates, sulfates, acetates, chlorides, formates or mixtures thereof, of nickel and/or cobalt, as well as nickel hypophosphite.

In another embodiment, the catalyst is prepared using a catalyst precursor comprising an (X) metal that comprises a water-soluble nickel component, such as nickel nitrate, nickel sulfate, nickel acetate, nickel chloride, or a mixture thereof. In another embodiment, the catalyst is prepared using a catalyst precursor comprising an (X) metal that comprises a nickel compound which is at least partly in the solid state, e.g., a water-insoluble nickel compound such as nickel carbonate, nickel hydroxide, nickel phosphate, nickel phosphite, nickel formate, nickel sulfide, nickel molybdate, nickel tungstate, nickel oxide, nickel alloys such as nickel-molybdenum alloys, Raney nickel, or a mixture thereof. In another embodiment, the catalyst is prepared using a catalyst precursor comprising an (X) metal that comprises\a water-soluble nickel sulfate solution which optionally also includes a second Promoter Metal compound, such as an iron component in the solute state selected from iron acetate, chloride, formate, nitrate, sulfate, or a mixture thereof. In one embodiment, the catalyst is prepared using a catalyst precursor that comprises an (X) metal comprising a nickel sulfate aqueous solution.

Sulfiding Agent Component: In one embodiment, the catalyst is prepared using a sulfiding agent in the form of a solution which, under prevailing conditions, is decomposable into hydrogen sulfide. Such a sulfiding agent can be used in any suitable amount in preparing the catalyst, such as in an amount in excess of the stoichiometric amount required to form the catalyst. In one embodiment, the sulfiding agent is present in a sulfur to molybdenum mole ratio of at least 3 to 1. Additionally, any suitable sulfiding agent (such as described above with respect to the catalyst precursor) can be used.

The use of sulfiding agents containing alkali- and/or alkaline earth metals, in this regard, may require an additional separation process step, during the catalyst preparation process, to remove the alkali- and/or alkaline earth metals from the spent catalyst.

In one embodiment, the sulfiding agent is an aqueous ammonium sulfide. Such a sulfiding agent can be prepared in any suitable manner, such as from hydrogen sulfide and ammonia. This synthesized ammonium sulfide is readily soluble in water and can easily be stored in aqueous solution in tanks prior to use. Since ammonium sulfide solution is more dense than resid, it can be separated easily in a settler tank after reaction.

Optional Component—Binder Material: In one embodiment, a binder is used in preparing the catalyst. Generally, the binder material has less catalytic activity than the catalyst (without the binder material) or no catalytic activity at all. Consequently, by adding a binder material, the activity of the catalyst may be reduced. In this regard, the amount of binder material to be used in making the catalyst generally depends on the desired activity of the final catalyst. Any suitable amount of binder material can be used in the catalyst preparation process, in this regard. For example, the binder material can be used in an amount of about 0-95 wt. % (such as about 0.1-85 wt. %, about 0.5-75 wt. %, or even about 1.0-65 wt. %), relative to the total weight of the catalyst.

Any suitable method can be used for using binder materials in preparing the catalyst. For example, the binder materials can be added to one or more catalyst precursors in any suitable manner, such as simultaneously or successively. In one embodiment, two or more metal-containing catalyst precursors are combined to form a mixture, and a binder material is subsequently added to the mixture. In another embodiment, metal-containing catalyst precursors are combined (either simultaneously or successively) to form a mixture, then a binder material is added to the mixture, and then additional metal-containing catalyst precursors are added (either simultaneously or successively) to the mixture. In another embodiment, the binder and metal-containing catalyst precursors are combined in the solute state to form a mixture, and then a metal-containing catalyst precursor that is at least partly in the solid state is subsequently added to the mixture.

In one embodiment, the binder material is mixed with a Group VIB metal and/or a Promoter Metal (such as a Group VIII non-noble metal) prior to being mixed with the bulk catalyst composition and/or prior to being added during the preparation of the bulk catalyst composition. Compositing the binder material with any of these metals in one embodiment is carried out by impregnation of the solid binder with these materials.

The binder material can comprise any materials that are conventionally utilized as binders in hydroprocessing catalysts. Suitable binder material include, for example, silica, alumina such as (pseudo) boehmite, silica-alumina compounds (such as silica-coated alumina and alumina-coated silica), gibbsite, titania, zirconia, cationic clays or anionic clays such as saponite, bentonite, kaoline, sepiolite or hydrotalcite, or combinations or mixtures thereof. In one embodiment, one or more binder materials are selected from silica, colloidal silica doped with aluminum, silica-alumina, alumina, titanium, zirconia, or a mixture thereof. In another embodiment, the binder material comprises a refractory oxide material having at least 50 wt. % of titania, on an oxide basis. Any suitable alumina binder can be used in the catalyst preparation process. In one embodiment, the alumina binder has a surface area ranging from 100 to 400 m$^2$/g, with a pore volume ranging from 0.5 to 1.5 ml/g measured by nitrogen adsorption. Similarly, any suitable titania binder can be used in the catalyst preparation process. In one embodiment, the titania of the binder has an average particle size of less than 50 microns (such as less than about 5 microns) and/or greater than 0.005 microns. In another embodiment, the titania of the binder has a BET surface area of 10 to 700 m$^2$/g.

In some embodiments, the binder material is a binder that has undergone peptization. In another embodiment, precursors of the binder materials are used in the preparation of the catalyst, wherein the precursor is converted into an effective or functional binder during the catalyst preparation process. Suitable binder material precursors, in this regard, include alkali metal aluminates (to obtain an alumina binder), water glass (to obtain a silica binder), a mixture of alkali metal aluminates and water glass (to obtain a silica alumina binder), a mixture of sources of a di-, tri-, and/or tetravalent metal such as a mixture of water-soluble salts of magnesium, aluminum and/or silicon (to prepare a cationic clay and/or anionic clay), chlorohydrol, aluminum sulfate, or a combination or mixture thereof.

In one embodiment with the incorporation of a binder or binders, the catalyst is of the formula $(M^r)_a(X^u)_b(Z)_f(S^v)_d(C^w)_e(H^x)_f(O^y)_g(N^z)_h$, with Z representing titanium and optionally one or more elements selected from aluminum, silicon, magnesium, zirconium, boron, and zinc.

Component—Hydrocarbon Transforming Agent: Any suitable hydrocarbon transforming agent can be used in preparing the catalyst. In one embodiment, a hydrocarbon transforming agent is used for transforming a catalyst precursor (hydrophilic) to an oil based catalyst (hydrophobic) of the formula $(M)_a(X)_b(S)_d(C)_e(H)_f(O)_g(N)_h$. Any suitable amount of a hydrocarbon transforming agent can be used in preparing the catalyst. In one embodiment, the weight ratio of the water based catalyst precursor to the hydrocarbon compound is in the range of 1:10 to 5:1. In another embodiment, the weight ratio of the water based catalyst precursor to hydrocarbon compound is in the range of 1:5 to 1:1.

Any suitable hydrocarbon can be used in this context, such as any acyclic, cyclic, saturated, unsaturated, unsubstituted, and/or inertly substituted hydrocarbon, or a combination or mixture thereof, such as a hydrocarbon that is liquid at ordinary temperatures. In one embodiment, the hydrocarbon compound is selected from the group consisting of straight chain saturated acyclic hydrocarbons (such as octane, tridecane, eicosane, nonacosane, or the like); straight chain unsaturated acyclic hydrocarbons (such as 2-hexene, 1,4-hexadiene, and the like); branched chain saturated acyclic hydrocarbons (such as 3-methylpentane, neopentane, isohexane, 2,7,8-triethyldecane, and the like); branched chain unsaturated acyclic hydrocarbons (such as 3,4-dipropyl-1,3-hexadiene-5-yne, 5,5-dimethyl-1-hexene, and the like); saturated or unsaturated cyclic hydrocarbons (such as cyclohexane, 1,3-cyclohexadiene, and the like); and aromatics (such as cumene, mesitylene, styrene, toluene, o-xylene, or the like). In another embodiment, the hydrocarbon compound is derived from petroleum, including admixtures of petroleum hydrocarbons characterized as virgin naphthas, cracked naphthas, Fischer-Tropsch naphtha, light cat cycle oil, heavy cat cycle oil, and the like, typically those containing from about 5 to about 30 carbon atoms. In another embodiment, the hydrocarbon compound is a vacuum gas oil (VGO).

In one embodiment, the hydrocarbon compound has a kinetic viscosity of at least 2 cSt at 100° C., such as a kinematic viscosity of about 2-15 cSt at 100° C., or even about 5-8 cSt at 100° C. In one embodiment, the ratio of the Group VIB metal (M) to hydrocarbon is less than 1.0. In a second embodiment, the ratio is less than 0.5. In a third embodiment, less than 0.1. When hydrocarbon transforming agents having a kinematic viscosity below 2 cSt @ 100° C. or above about 15 cSt @ 100° C. are used, the transformation of the catalyst precursor can result in catalyst particles agglomerating or otherwise not mixing.

As discussed herein, the composition and structure of the catalyst can be varied in any suitable manner, such as by altering the process for preparing the catalyst, such as described, for example, in U.S. patent application Ser. No. 11/931,972, filed on Oct. 31, 2007; and in U.S. patent application Ser. No. 11/933,085, filed on Oct. 31, 2007.

Other Additives

Any additional additives can be utilized during or subsequent to the pretreating step, such as, to enhance or facilitate the pretreatment process (such as by enhancing, facilitating, and/or enhancing dispersion of the catalyst or catalyst precursor into the carbonaceous material) and/or to enhance or facilitate hydroconversion of the pretreated carbonaceous material.

Any suitable surfactant can be utilized in the context of the invention, such as to improve dispersion, metal surface area, morphology, and/or other characteristics of the catalyst or catalyst precursor. Suitable surfactants include, for example, any anionic surfactant, zwitterionic surfactant, amphoteric surfactant, nonionic surfactant, cationic surfactant, or combination or mixture thereof. Suitable non-ionic surfactants include, for example, polyoxyethylenesorbitan monolaurate, polyoxyethylenated alkyphenols, polyoxyethylenated alkyphenol ethoxylates, and the like. Suitable cationic surfactants include, for example, quarternary long-chain organic amine salts, quarternary polyethoxylated long-chain organic amine salts, and the like, such as water-soluble cationic amines (e.g., cetyl trimethyl ammonium bromide, cetyl trimethyl ammonium chloride, dodecyl trimethyl ammonium amine, nonyl trimethyl ammonium chloride, dodecyl phenol quaternary amine soaps, or combinations or mixtures thereof). Suitable surfactants can also comprise solvent materials having a high surface tension property, such as ethylene carbonate; benzophenone; benzyl cyanide; nitrobenzene; 2-phenylethanol; 1,3-propanediol; 1,4-butanediol; 1,5-pentanediol; diethyleneglycol; triethyleneglycol; glycerol; dimethyl sulfoxide; N-methyl formamide; N-methyl pyrrolidone; and combinations and mixtures thereof. Suitable surfactants also include those surfactants having a high surface tension, such as N-methyl pyrrolidone. Other examples of surfactants include acetonitrile, acetone, ethyl acetate, hexane, diethyl ether, methanol, ethanol, acetyl acetone, diethylcarbonate, chloroform, methylene chloride, diethyl ketone, and combination and mixtures thereof. In another embodiment, the surfactant comprises a nitrogen- or phosphorous-containing organic additive having a carbosulfide phase with enhanced catalytic activities. The amount of the N-containing/P-containing organic additive to be added generally depends on the desired activity of the final catalyst composition.

In another embodiment, the surfactant is an ammonium or phosphonium of the formula $R_1R_2R_3R_4Q+$, wherein Q is nitrogen or phosphorous, wherein at least one of $R_1$, $R_2$, $R_3$, $R_4$ is an aryl or alkyl group having 8-36 carbon atoms (e.g., $C_{10}H_{21}$, $C_{16}H_{33}$, $C_{18}H_{37}$, or a combination thereof), and wherein the remainder of $R_1$, $R_2$, $R_3$, $R_4$ is selected from the group consisting of hydrogen, an alkyl group having 1-5 carbon atoms, or a combination thereof. Suitable such examples of surfactants include: cetyltrimethylammonium, cetyltrimethylphosphonium, octadecyltrimethylphosphonium, cetylpyridinium, myristyltrimethylammonium, decyltrimethylammonium, dodecyltrimethylammonium, dimethyldidbdecylammonium, or a combination or mixture thereof. The compound from which the above ammonium or phosphonium ion is derived may be, for example, a hydroxide, halide, silicate, or combination or mixture thereof.

In one embodiment, the surfactant comprises a nitrogen-containing organic additive, such as aromatic amines, a cyclic aliphatic amines, a polycyclic aliphatic amines, or a combination or mixture thereof. In another embodiment, the surfactant comprises a nitrogen-containing organic additive is selected from compounds containing at least one primary, secondary, and/or tertiary amine group (such as hexamethylenediamine, monoethanolamine, diethanolamine, triethanolamine, N,N-dimethyl-N'-ethylethylenediamine, or a combination or mixture thereof); amino alcohols (such as, for example, 2 (2-amino ethyl amino)ethanol, 2 (2-aminoethoxy, or a combination or mixture thereof) ethanol, 2-amino-1-butanol, 4-amino-1-butanol, 2,2-diethoxyethylamine, 4,4-diethoxybutylamine, 6-amino-1-hexanol, 2-amino-1,3-propanediol, 3-amino-1,2-propanediol, 3-amino-1-propanol, or a combination or mixture thereof); and amino alkoxy-silanes (such as, for example, 3-glycidoxypropyl) trimethoxysilane, 3-(2-aminoethylamino)propyltrimethoxysilane, 3-aminopropyl)trimethoxy-silane, or a combination or mixture thereof).

In another embodiment, the surfactant is an organic carboxylic acid surfactant or stabilizer. In one embodiment, for example, the surfactant is citric acid. In another embodiment, the surfactant is pentadecanoic acid, decanoic acid, or other similar long chain acids. In yet another embodiment, the surfactant is alginic acid.

The optional additives can be utilized at any suitable point prior to or after the pretreatment process and/or hydroconversion process. In one embodiment, one or more additives are combined with one or more of the carbonaceous material, hydrocarbonaceous liquid, and one or more catalysts or catalyst precursors prior to pretreatment. In another embodiment, the additive(s) are combined with the carbonaceous material, hydrocarbonaceous liquid, and catalysts or catalyst precursors during the pretreatment process. In another embodiment, the additive(s) are combined with the pretreated carbonaceous material following pretreatment and before hydroconversion. In yet another embodiment, the additive(s) are combined with the pretreated carbonaceous material following during hydroconversion.

The additive(s) can be utilized in any suitable concentration. In one embodiment, for example, the additive(s) are utilized in a concentration of about 0.001 to 5 wt. % of the total pretreatment mixture. In another embodiment, the additive(s) are utilized in a concentration of about 0.005 to 3 wt. % of the total pretreatment mixture. In another embodiment, the additive(s) are utilized in a concentration of about 0.01 to 2 wt. % of the total pretreatment mixture. If the additive(s) are solely added to the hydroconversion feedstock, the amount to be added ranges from 0.001 to 0.05 wt. % (such as about 0.005-0.01 wt. %) of the feed, or in any suitable concentration, such as described, for example, in Acta Petrolei Sinica, Vol. 19, Issue 4, pp. 36-44, ISSN 10018719 and in Khimiya I Tekhnologiya Topilv I Masel, Issue 3, Year 1997, pp. 20-21, ISSN 00231169, the contents of which are incorporated herein by reference in their entirety.

Mixing

Any suitable method or system can be used to combine and/or mix the carbonaceous material with the hydrocarbonaceous liquid and the catalysts or catalyst precursors. In some embodiments, any suitable mixer is used to simultaneously, successively, and/or sequentially mix the carbonaceous material, hydrocarbonaceous liquid, and the catalyst or catalyst precursors in a manner suitable to form a homogenous or heterogeneous mixture (or slurry), as desired. In other embodiments, a mixer is utilized in conjunction with any suitable grinder (such as a hammer mill, a ball mill, a rod mill, or a combination thereof, or the like), such that at least a portion of the carbonaceous material is ground, optionally in the presence of the hydrocarbonaceous liquid and/or the one or more catalysts or catalyst precursors and mixed to form a homogenous or heterogeneous slurry, as desired. In some embodiments, the mixer and/or grinder comprises a gas delivery system for providing an inert or a reducing atmosphere (such as, for example, hydrogen, nitrogen, helium, argon, syn-gas, or any combination or mixture thereof) during mixing and/or grinding of the carbonaceous material, the hydrocarbonaceous liquid, and/or the catalyst or catalyst precursors. In some embodiments, the mixer and/or grinder are situated upstream of the pretreatment system. In other embodiments, the mixer and/or grinder form a portion of the pretreatment system.

Hydroconversion

Following pretreatment, the carbonaceous material can be subjected to any suitable hydroconversion and/or liquefaction conditions to produce any desired liquid and/or gaseous products. The pretreated carbonaceous material (such as pretreated coal) may be introduced into at least one hydroconversion zone wherein the pretreated carbonaceous material encounters suitable temperature, pressure, and additives (such as sulfur-containing compounds) to at least partially or substantially activate the catalyst or catalyst precursor of the pretreated carbonaceous material, and generates liquid and/or gaseous products. In one embodiment, for example, greater than about 50 wt. %, such as about 55 wt. %, about 60 wt. %, about 65 wt. %, about 70 wt. %, about 75 wt. %, about 80 wt. %, about 85 wt. %, about 90 wt. %, about 95 wt. %, about 96 wt. %, about 97 wt. %, about 98 wt. %, or even about 99 wt. % of the catalyst or catalyst precursor of the pretreated carbonaceous material becomes active catalyst, such that it possesses and/or exhibits hydroconverting activity.

Suitable hydroconverting temperatures include, but are not limited to, temperatures greater than about 350° C., such as greater than about 375° C., about 400° C., about 425° C., about 450° C., about 475° C., about 500° C. Suitable hydroconverting pressures include, but are not limited to, 300-5000 psig (such as about 300-4800 psig, about 300-4600 psig, about 300-4400 psig, about 300-4200 psig, about 400-4000 psig, about 500-3500 psig, about 1000-3000 psig, 1200-2800 psig, 1400-2600 psig, or even about 1500-2600) of any suitable gas such as a hydrogen containing gas (such as a hydrogen/methane mixture, or a hydrogen/carbon dioxide/water mixture) atmosphere and/or a syn-gas atmosphere. In one embodiment, in this regard, the pretreated carbonaceous material is suitable for low or lower pressure hydroconversion (such as a hydroconversion pressure less than about 2000 psig, such as less than about 1800 psig, or even less than about 1600 psig). Specifically, for example, hydroconversion of the pretreated carbonaceous material can yield at least about 10% higher (such as at least about 20%, about 40%, about 60%, about 80%, about 100%, about 150%, about 200%, about 300%, or even at least about 400% higher liquid product yield at a hydroconversion pressure less than about 2000 psig (such as less than about 1800 psig, or even less than about 1600 psig) than the same carbonaceous material that has not been pretreated. In another embodiment, hydroconversion of the pretreated carbonaceous material consumes about 10% less (such as about 20%, about 30%, about 40%, about 50%, about 60%, about 70%, about 80%, about 90%, or even about 100% less) hydrogen, as compared to the same carbonaceous material that has not been pretreated.

In one embodiment, hydroconversion and/or liquefaction of the pretreated carbonaceous material occurs in a single reactor. In another embodiment, hydroconversion and/or liquefaction of the pretreated carbonaceous material occurs in two or more (such as a plurality) of zones or reactors for hydroconversion which may be arranged in any suitable manner (such as in parallel, or in series such that, for example, the temperature in each reactor in series is progressively higher and/or there is a commensurate increase in the hydrogen partial pressure in each downstream reactor). Preferably, hydroconversion and/or liquefaction of the pretreated carbonaceous material occurs in a reactor or zone that is separate and/or distinct from the pretreatment reactor or zone.

In one embodiment, hydroconversion and/or liquefaction of the pretreated carbonaceous material produces a liquid yield greater than about 50%, about 55%, about 60%, about 65%, about 70%, about 75%, about 80%, about 85%, about 87%, about 90%, about 95%, or even greater than about 99%. In another embodiment, pretreatment of the carbonaceous material results in a liquid yield that is at least about 10% higher (such as at least about 15%, about 20%, about 25%, about 30%, about 35%, or even at least about 40% higher) than the liquid product yield of a similar carbonaceous material that is not pretreated prior to hydroconversion. In another embodiment, hydroconversion and/or liquefaction of the pretreated carbonaceous material produces a total conversion (such as of coal) greater than about 80%, about 85%, about 90%, about 95%, or even 99%.

In some embodiments, pretreatment of the carbonaceous material results in a total conversion (such as of coal) that is at least about 5% higher (such as at least about 10%, about 12%, about 14%, about 16%, about 18%, or even at least about 20% higher) than the conversion of a similar carbonaceous material that is not pretreated prior to hydroconversion. In other embodiments, hydroconversion and/or liquefaction of the pretreated carbonaceous material produces less than about 10% (such as less than about 8%, about 6%, about 4%, about 3%, about 2%, or even less than about 1%) of $C_1$-$C_3$ gases.

Separation of Hydroconversion Products

The effluent from the hydroconversion zone can be fed into any suitable one or more separation zones. In one embodiment, the effluent is fed into a first separation zone wherein lighter products such as gases, naptha, and distillate are removed via overhead lines. Such a first separation zone can be run at a substantially atmospheric pressure. A bottoms, or high boiling, fraction of the effluent from the first separation zone can optionally be recycled to pretreatment zone. All or some of the remaining effluent of the first separation zone can be passed to a second separation zone wherein it is fractionated into a gas oil fraction and a bottoms fraction. The bottoms fraction of the second separation zone can be passed to a third separation zone. A portion of the gas oil can be recycled to the hydroconversion zone. In this regard, any suitable high pressure, medium pressure, and low pressure separators can be used in the context of the present invention.

Recovery of Catalyst or Catalyst Precursor

The one or more separation systems or zones can be followed by one or more catalyst and/or metal recovery systems or zones in which at least a portion (such as one or more metals) of the catalyst and/or catalyst precursor is recovered from one or more portions or fractions of the hydroconverted carbonaceous material. In one embodiment, metal from a metal-containing catalyst and/or metal-containing catalyst precursor is recovered in the recovery system from a solids fraction (such as a residual solids fraction) of the hydroconverted carbonaceous material that was separated and/or collected in the separation system (and which may include ash).

The recovery system can be operated at any suitable temperature, such as at a temperature of about 1200-1900° C., such as about 1300-1800° C., or even 1400-1700° C. In one embodiment, the recovery system provides an atmosphere of air that is suitable to cause spent catalysts (such as molybdenum sulfides) to be oxidized and sublimated to $MoO_3$, in the case where the metal is molybdenum, such as described in U.S. patent application Ser. No. 60/015,096, filed Dec. 19, 2007, the contents of which are incorporated by reference in their entirety. The treated spent catalyst, catalyst precursor, and/or recovered metal can be collected and passed from the catalyst recovery zone to a catalyst or catalyst precursor preparation zone.

Catalyst or Catalyst Precursor Preparation

The one or more recovery systems can be followed by one or more catalyst or catalyst precursor preparation systems, in which at least a portion of the catalyst or catalyst precursor (such as metal of the catalyst precursor) recovered in the recovery system is reacted to form a catalyst or catalyst precursor (such as the same catalyst or catalyst precursor that was originally used to pretreat the carbonaceous material).

In one embodiment, for example, a recovered metal of the catalyst or catalyst precursor (such as $MoO_3$) is reacted with a sulfur compound (such as ammonium sulfide) to form ammonium terathiomolybdate catalyst precursor. The resulting formed catalyst or catalyst precursor can then be delivered, optionally in combination with new or fresh catalyst precursor, into the pretreatment system and/or the hydroconversion system.

As is further illustrated in the following Examples, the systems and methods described herein can be used to achieve optimization and efficiency in the production of any desired proportions (or yield percentages) of liquid and/or gas products having a variety of desired properties. Specifically, a full range of hydroconversion products can be accomplished under a variety of hydroconversion conditions (such as at low hydrogen pressure and/or with short duration) through selection of any of a variety of combinations of hydrocarbonaceous liquid, catalysts and/or catalyst precursors, as well as pretreatment and hydroconversion conditions. In this manner, the systems and method offers tremendous flexibility to a user in being able to achieve desired hydroconversion products from any solid carbonaceous material using any of a variety of different combinations of hydrocarbonaceous liquid, catalyst, and/or catalyst precursor, as well as pretreatment and hydroconversion conditions.

EXAMPLES

The following examples are given as particular embodiments of the invention and to demonstrate the advantages thereof. It is understood that the examples are given by way of illustration and are not intended to limit the specification or the claims that follow in any manner.

Example 1

Coal liquefaction yields were compared for a first pretreatment composition having coal particles that were subjected to pretreatment conditions but without a catalyst precursor ("Pretreatment Composition 1") and a second pretreatment composition comprising coal particles that were pretreated with catalyst precursor ("Pretreatment Composition 2").

Pretreatment Composition 1 was prepared by mixing an FCC-type process oil (500° F.+ cut) and pre-dried coal (having a moisture content less than 1% and a particle size of 100 mesh) in a solvent to coal ratio of 1.6:1. The pretreatment composition was heated to a temperature of 200° C., pressurized to 500 psig of hydrogen gas, and kept at this temperature and pressure for 120 minutes. Molybdenum dithiocarbamate (MoDtc, Molyvan A) in an amount equivalent to 1000 ppm elemental Molybdenum, based on the total weight of the pretreatment composition, was added to the mixture after the pretreatment step.

Pretreatment Composition 2 was prepared by mixing Molyvan A, in an amount equivalent to 1000 ppm elemental Mo, with an FCC-type process oil (500° F.+ cut) and pre-dried coal (having a moisture content less than 1% and a particle size of 100 mesh), wherein the solvent:coal ratio is 1.6:1. The pretreatment composition was heated to a temperature of 200° C., pressurized to 500 psig of hydrogen gas, and kept at this temperature and pressure for 120 minutes.

Following pretreatment, Pretreatment Compositions 1 and 2 were subjected to a hydroconversion temperature of 426° C. and a hydroconversion pressure of 2550 psig of hydrogen gas for 180 minutes.

The liquid yield %, coal conversion % and gas yield % of each of Pretreatment Compositions 1 and 2 were determined following hydroconversion, and are set forth in Table 1(A). Each was calculated on a dry, ash-free basis (d.a.f.) in the following manner. In particular, liquid yield was calculated on a weight basis using the following equation: liquid yield=100%×(toluene soluble liquid/d.a.f. coal). Gas yield was calculated on a weight basis using the following equation: gas yield=100%×($C_1$-$C_3$+CO+$CO_2$+$H_2S$+$NH_3$)/d.a.f. coal. The liquid product distribution for Pretreatment Composition 2, which is set forth in Table 1(B), was determined by subtracting the simulated distillation ("sim dist") result (or boiling curve) of the hydrocarbonaceous liquid from the sim dist result (or boiling curve) of the mixture of hydrocarbonaceous liquid and liquid product. The coal conversion value set forth in Table 1(B) was obtained by subtracting the value set forth in row 9 of the table from the sum of rows 2, 6, 7, and 8 of the table.

TABLE 1(A)

| Pretreatment Composition | Liquid yield (%) | Coal Conversion (%) | Gas yield (%) |
| --- | --- | --- | --- |
| 1 | 67.19 | 90.19 | 10.20 |
| 2 | 80.58 | 96.93 | 10.29 |

TABLE 1(B)

| | | Pretreatment Composition 2 (%) |
| --- | --- | --- |
| 1 | Coal Conversion | 96.93 |
| 2 | $C_1$-$C_3$ gases | 3.27 |
| 3 | $C_4$-350 F. | 13.92 |
| 4 | 350-650 F. | 38.89 |
| 5 | 650-1000 F. | 25.29 |
| 6 | $C_4$-1000 F. | 78.10 |
| 7 | >1000 F. | 2.49 |
| 8 | Heteroatoms (CO, $CO_2$, $H_2S$, $NH_3$, $H_2O$) | 19.54 |
| 9 | $H_2$ Consumption | 6.46 |

As is evident from the results in Table 1(A), pretreatment of the coal particles with a catalyst precursor improved the liquid yield and coal conversion of the coal particles.

Example 2

The effect of different pretreatment times on liquid yield, coal conversion, and gas yield of the pretreated carbonaceous material was determined.

Pretreatment Compositions 3-5 were prepared by mixing Molyvan A in an amount equivalent to 1000 ppm elemental Mo, based on the total weight of each pretreatment composition, with a FCC-type process oil (500° F.+ cut) and pre-dried coal (having a moisture content less than 1% and a particle size of 100 mesh), wherein the ratio of solvent to coal was 1.6:1. Pretreatment Compositions 3-5 were heated to a temperature of 200° C., pressurized to 500 psig hydrogen gas, and kept at the temperature and pressure for a 0, 30 and 60 minutes, respectively. The 0 minute duration was met by heating Pretreatment Composition 3 to 200° C., and then immediately removing the composition from the heat source. Pretreatment Composition 2 was prepared as described in Example 1 (with a pretreatment reaction time of 120 minutes).

Each Pretreatment Composition was then subjected to a hydroconversion temperature of 426° C. and a hydroconversion pressure of 2550 psig hydrogen gas for 180 minutes The liquid yield %, coal conversion % and gas yield % for each Reaction Mixture were determined following hydroconversion, and are set forth in Table 2. Each was calculated on a dry, ash-free basis, in the manner discussed in Example 1.

TABLE 2

| Pretreatment Composition | Liquid yield (%) | Coal conversion (%) | Gas yield (%) |
|---|---|---|---|
| 3 | 72.03 | 90.75 | 10.31 |
| 4 | 73.93 | 89.04 | 9.78 |
| 5 | 76.04 | 91.03 | 9.45 |
| 2 | 80.58 | 96.93 | 10.29 |

As is evident from the results set forth in Table 2, the duration or reaction time of pretreatment of a carbonaceous material directly affects the liquid yield %, coal conversion %, and gas yield % obtainable from the pretreated carbonaceous material during hydroconversion.

Example 3

The effect of coal pretreatment and hydroconversion with different hydrocarbonaceous liquids on liquid yield, coal conversion, and gas yield of a carbonaceous material was determined.

Pretreatment Compositions 6-8 were prepared by mixing Molyvan A in an amount equivalent to 1000 ppm elemental Mo, based on the total weight of each pretreatment composition, with pre-dried coal (having a moisture content less than 1% and a particle size of 100 mesh) and one of three different hydrocarbonaceous liquids, wherein the solvent:coal ratio in each of the reaction mixtures was 1.6:1. Specifically, the hydrocarbonaceous liquids of Compositions 6-8 were: (i) anthracene for Composition 6, (ii) 9,10 dihydroanthracene for Composition 7, and (iii) tetralin for Composition 8. Pretreatment Compositions 6-8 were heated to a temperature of 200° C., pressurized to 500 psig of hydrogen gas, and kept at this temperature and pressure for 120 minutes. Pretreatment Composition 2 was prepared as described in Example 1 (using a FCC-type process oil (500° F.+ cut)).

Pretreatment Compositions 2 and 6-8 were then subjected to a hydroconversion temperature of 426° C. and a hydroconversion pressure of 2550 psig of hydrogen gas, for 180 minutes.

The liquid yield %, coal conversion % and gas yield % of each of Pretreatment Compositions 2 and 6-8 were determined following hydroconversion, and are set forth in Table 3. Each was calculated on a dry, ash-free basis, in the manner discussed in Example 1.

TABLE 3

| Pretreatment Composition | Liquid yield (%) | Coal Conversion (%) | Gas yield (%) |
|---|---|---|---|
| 2 | 80.58 | 96.93 | 10.29 |
| 6 | 75.64 | 95.92 | 14.22 |
| 7 | 78.68 | 97.58 | 18.82 |
| 8 | 75.82 | 95.98 | 13.26 |

As is evident from the results set forth in Table 3, the identity of the hydrocarbonaceous liquid used in the pretreatment of a carbonaceous material directly affects the liquid yield %, coal conversion %, and gas yield % obtainable from the pretreated carbonaceous material during hydroconversion.

Example 4

The effect of coal pretreatment with different catalyst precursors on liquid yield, coal conversion, and gas yield of a carbonaceous material was determined.

Pretreatment Compositions 9-12 were prepared by mixing an FCC-type process oil (500° F.+ cut) and pre-dried coal (having a moisture content less than 1% and a particle size of 100 mesh) in the solvent:coal ratio of 1.6:1 with (i) molybdenum 2-ethylhexylphosphoro-dithioate (Molyvan L) for Composition 9, (ii) molybdenum dialkyldithiocarbamate (Molyvan 2000) for Composition 10, (iii) molybdenum dialkyldithiocarbamate (Molyvan 822) for Composition 11, and (iv) $MoS_2$ Slurry catalyst for Composition 12, respectively. An amount of catalyst equivalent to 1000 ppm elemental Mo, based on the total weight of the pretreatment composition, was used in each pretreatment composition. Pretreatment Compositions 9-12 were heated to a temperature of 200° C., pressurized to 500 psig of hydrogen gas, and kept at this temperature and pressure for 120 minutes. Pretreatment Composition 2 was prepared as described in Example 1 (using Molyvan A).

Pretreatment Composition 13 comprised an FCC-type process oil (500° F.+ cut) and pre-dried coal (having a moisture content less than 1% and a particle size of 100 mesh) in solvent:coal ratio of 1.6:1, and ammonium tetrathiomolybdate (ATTM) equivalent to 1000 ppm elemental Mo. This Pretreatment Composition was prepared by (i) dissolving the ATTM in a 1:1 water:methanol solution at pH 8-9 (adjusted by $NH_4OH$), (ii) mixing the coal with the ATTM aqueous solution, and (iii) drying the coal under nitrogen gas for 48 hours.

Pretreatment Compositions 2 and 9-13 were then subjected to a hydroconversion temperature of 426° C., and a hydroconversion pressure of 2550 psig of hydrogen gas, for 180 minutes.

The liquid yield %, coal conversion % and gas yield % of each of Pretreatment Compositions 2 and 9-13 were determined following hydroconversion, and are set forth in Table 4. Each was calculated on a dry, ash-free basis, in the manner discussed in Example 1.

TABLE 4

| Pretreatment Composition | Liquid yield (%) | Coal Conversion (%) | Gas yield (%) |
|---|---|---|---|
| 2 | 80.58 | 96.93 | 10.29 |
| 9 | 74.36 | 92.68 | 9.98 |
| 10 | 81.53 | 89.12 | 9.38 |
| 11 | 76.28 | 91.48 | 11.98 |
| 12 | 78.26 | 91.56 | 13.99 |
| 13 | 72.03 | 92.14 | 16.37 |

As is evident from the results set forth in Table 4, the identity of catalyst precursor used in the pretreatment of a carbonaceous material directly affects the liquid yield %, coal conversion %, and gas yield % obtainable from the pretreated carbonaceous material during hydroconversion

Example 5

The effect of coal pretreatment and hydroconversion with different concentrations of catalyst precursor on liquid yield, coal conversion, and gas yield of a carbonaceous material was determined.

Pretreatment Compositions 14-16 were prepared by mixing an FCC-type process oil (500° F.+ cut) and pre-dried coal (having a moisture content less than 1% and a particle size of 100 mesh) in a solvent:coal ratio of 1.6:1 with Molyvan A concentrations equivalent to i) 100 ppm for Composition 14, ii) 250 ppm for Composition 15, iii) 1000 ppm for Composition 16 elemental Mo respectively, based on the total weight of pretreatment compositions. Pretreatment Compositions 14-16 were heated to a temperature of 200° C., pressurized to 500 psig of hydrogen gas, and kept at the temperature and pressure for 120 minutes. Pretreatment Composition 2 was prepared as described in Example 1 (with a Molyvan A concentration equivalent to 1000 ppm elemental Mo, as on the total weight of the pretreatment composition).

Pretreatment Compositions 2 and 14-16 were then subjected to a hydroconversion temperature of 426° C., and a hydroconversion pressure of 2550 psig of hydrogen gas, for 180 minutes.

The liquid yield %, coal conversion % and gas yield % of each of Pretreatment Compositions 2 and 14-16 were determined following hydroconversion, and are set forth in Table 5. Each was calculated on a dry, ash-free basis, in the manner discussed in Example 1.

TABLE 5

| Pretreatment Composition | Liquid yield (%) | Coal Conversion (%) | Gas yield (%) |
|---|---|---|---|
| 2 | 80.58 | 96.93 | 10.29 |
| 14 | 42.40 | 74.08 | 16.82 |
| 15 | 61.85 | 80.48 | 12.44 |
| 16 | 73.39 | 88.50 | 11.49 |

As is evident from the results set forth in Table 5, the concentration of catalyst precursor used in the pretreatment of a carbonaceous material directly affects the liquid yield %, coal conversion %, and gas yield % obtainable from the pretreated carbonaceous material during hydroconversion.

Example 6

The effect of pretreatment with different concentrations of catalyst precursor on liquid yield, coal conversion, and gas yield of a carbonaceous material was determined.

Pretreatment Composition 17 was prepared by mixing tetralin and pre-dried coal (having a moisture content less than 1% and a particle size of 100 mesh) in solvent:coal ratio of 1.6:1 with a Molyvan A concentration equivalent to 250 ppm of elemental Mo (based on the total weight of the Pretreatment Composition). Pretreatment Composition 17 was heated to a temperature of 200° C., pressurized to 500 psig of hydrogen gas, and kept at this temperature and pressure for 120 minutes. Pretreatment Composition 8 was prepared as described in Example 3 (with a Molyvan A concentration equivalent to 1000 ppm elemental Mo, based on the total weight of the pretreatment composition).

Pretreatment Compositions 8 and 17 were then subjected to a single-stage hydroconversion process at a temperature of 426° C. and pressure of 2550 psig of hydrogen gas, for 180 minutes.

The liquid yield %, coal conversion % and gas yield % of each of Pretreatment Compositions 8 and 17 were determined following hydroconversion, and are set forth in Table 6. Each was calculated on a dry, ash-free basis, in the manner discussed in Example 1.

TABLE 6

| Pretreatment Composition | Liquid yield (%) | Coal Conversion (%) | Gas yield (%) |
|---|---|---|---|
| 17 | 73.12 | 94.57 | 9.98 |
| 8 | 75.82 | 95.98 | 13.26 |

As is evident from the results set forth in Table 6, the concentration of catalyst precursor used in the pretreatment of a carbonaceous material directly affects the liquid yield %, coal conversion %, and gas yield % obtainable from the pretreated carbonaceous material during hydroconversion.

Example 7

The effect of different hydroconversion pressures on liquid yield, coal conversion, and gas yield of a pretreated carbonaceous material was determined.

Pretreatment Composition 18 was prepared by mixing an FCC-type process oil (500° F.+ cut) and pre-dried coal (having a moisture content less than 1% and a particle size of 100 mesh) in solvent:coal ratio of 1.6:1 with Molyvan A equivalent to 1000 ppm elemental Mo (based on the total weight of the Pretreatment Composition). Pretreatment Composition 18 was heated to a temperature of 200° C., pressurized to 500 psig of hydrogen gas, and kept at this temperature and pressure for 120 minutes. Pretreatment Composition 2 was prepared as described in Example 1.

Pretreatment Compositions 2 and 18 were then subjected to a single-stage hydroconversion process at a temperature of 426° C. and pressures of (i) 2550 psig for Composition 2 and (ii) 1600 psig for Composition 18 of hydrogen gas, respectively, for 180 minutes.

The liquid yield %, coal conversion %, gas yield %, hydrogen consumption (scf/bbl), and H/C ratio of each of Pretreatment Compositions 2 and 18 were determined following hydroconversion, and are set forth in Table 7(A). Each was calculated on a dry, ash-free basis, in the manner discussed in Example 1. The liquid and product distribution for Pretreatment Compositions 2 and 18 was determined by subtracting the sim-dist result of fresh hydrocarbonaceous liquid from the sim-dist results of the liquid product and solvent mixture, and are set forth in Table 7(B). The hydrogen consumption was determined by mass balance calculations. The H/C ratio of the liquid product fraction was determined by subtracting the H/C ratio of fresh hydrocarbonaceous liquid from the H/C ration of the liquid product and hydrocarbonaceous liquid mixture.

TABLE 7(A)

| Pretreatment Composition | Liquid yield (%) | Coal Conversion (%) | Gas yield (%) | Hydrogen Consumption (scf/bbl) | H/C Ratio |
|---|---|---|---|---|---|
| 2 | 80.58 | 96.93 | 10.29 | 4963.33 | 1.21 |
| 18 | 68.59 | 89.33 | 15.99 | 1855.31 | 1.05 |

TABLE 7(B)

|  | Pretreatment Composition 2 | Pretreatment Composition 18 |
|---|---|---|
| Coal Conversion | 96.93 | 89.33 |
| $H_2$ (%) | −6.46 | −2.28 |
| $C_1$-$C_3$ | 3.27 | 7.16 |
| $C_4$-1000 F. | 78.10 | 67.60 |
| $C_4$-350 F. | 13.92 | 11.44 |
| 350-650 F. | 38.89 | 38.98 |
| 650-1000 F. | 25.29 | 17.17 |
| >1000 F. | 2.49 | 0.99 |

As is evident from the results set forth in Tables 7(A) and (B), pretreatment of the carbonaceous material directly affects the liquid yield %, coal conversion %, gas yield %, hydrogen consumption, and H/C ratio obtainable from the pretreated carbonaceous material during hydroconversion at both high hydroconversion pressure and at a reduced hydroconversion pressure. Additionally, hydroconversion of the pretreated carbonaceous material at the reduced hydrogen pressure resulted in reduced hydrogen consumption during hydroconversion and reduced H/C ratio in the coal liquid product fractions.

Example 8

The effect of different hydroconversion pressures on liquid yield, coal conversion, and gas yield of a pretreated carbonaceous material was determined.

Pretreatment Composition 8 was prepared as described in Example 3. Pretreatment Compositions 19-20 were prepared in the same manner as Pretreatment Composition 8, by mixing tetralin and pre-dried coal (having a moisture content less than 1% and a particle size of 100 mesh) in a tetralin to coal ratio of 1.6:1 with Molyvan A (in an amount equivalent to 1000 ppm elemental Mo, based on the total weight of the Pretreatment Compositions; heating the mixtures to a temperature of 200° C. at a pressure of 500 psig of hydrogen gas; and keeping the mixtures at this temperature and pressure for 120 minutes.

Pretreatment Compositions 8 and 19-20 were then subjected to a single-stage hydroconversion process at a temperature of 426° C. and pressures of (i) 2550 psig for Composition 8 and (ii) 1600 psig for Composition 19, and (iii) 1000 psig of hydrogen gas, respectively, for 180 minutes.

The liquid yield %, coal conversion %, gas yield %, hydrogen consumption (scf/bbl), and H/C ratio of each of Pretreatment Compositions 8, 19 and 20 were determined following hydroconversion, and are set forth in Table 8(A). Each was calculated on a dry, ash-free basis, in the manner discussed in Example 1. The liquid and product distribution for Pretreatment Compositions 8 and 19 was determined by subtracting the sim-dist result of fresh hydrocarbonaceous liquid from the sim-dist results of the liquid product and solvent mixture, and are set forth in Table 8(B). The hydrogen consumption was determined by mass balance calculations. The H/C ratio of the liquid product fraction was determined by subtracting the H/C ratio of fresh hydrocarbonaceous liquid from the H/C ration of the liquid product and hydrocarbonaceous liquid mixture.

TABLE 8(A)

| Pretreatment Composition | Liquid yield (%) | Coal Conversion (%) | Gas yield (%) | Hydrogen Consumption (scf/bbl) | H/C Ratio |
|---|---|---|---|---|---|
| 8 | 75.82 | 95.98 | 13.26 | 3248.45 | 1.17 |
| 19 | 75.13 | 93.22 | 17.58 | 2002.25 | 0.89 |
| 20 | 63.15 | 92.91 | 13.18 | 1322.30 | — |

TABLE 8(B)

|  | Pretreatment Composition 8 | Pretreatment Composition 19 |
|---|---|---|
| Coal Conversion | 95.98 | 93.22 |
| $H_2$ (%) | −4.24 | −2.61 |
| $C_1$-$C_3$ | 0.22 | 5.42 |
| $C_4$-1000 F. | 75.42 | 75.04 |
| $C_4$-350 F. | 2.25 | 3.49 |
| 350-650 F. | 66.05 | 64.94 |
| 650-1000 F. | 7.12 | 6.61 |
| >1000 F. | 0.40 | 0.09 |

As is evident from the results set forth in Tables 8(A) and 8(B), pretreatment of the carbonaceous material directly affects the liquid yield %, coal conversion %, gas yield %, hydrogen consumption, and H/C ratio obtainable from the pretreated carbonaceous material during hydroconversion at both high hydroconversion pressure as well as at reduced hydroconversion pressures. Additionally, hydroconversion of the pretreated carbonaceous material at the reduced hydrogen pressure resulted in reduced hydrogen consumption during hydroconversion and reduced H/C ratio in the coal liquid product fractions.

Example 9

The effect of different hydroconversion reaction times, as well as different catalyst concentrations during pretreatment, on liquid yield, coal conversion, and gas yield of a pretreated carbonaceous material was determined.

Pretreatment Composition 2 was prepared as described in Example 1. Pretreatment Composition 21 was prepared in the same manner as Pretreatment Composition 2, by mixing a "FCC-type" process oil (500° F.+ cut) and pre-dried coal (having a moisture content less than 1% and a particle size of 100 mesh) in solvent:coal ratio of 1.6:1 with Molyvan A (in an amount equivalent to 1000 ppm elemental Mo, based on the total weight of the Pretreatment Composition); heating the mixture to a temperature of 200° C. at a pressure of 500 psig of hydrogen gas; and keeping the mixture at this temperature and pressure for 120 minutes.

Pretreatment Composition 15 was prepared as described in Example 5. Pretreatment Compositions 22-23 were prepared in the same manner as Pretreatment Composition 15, by mixing an FCC-type process oil (500° F.+ cut) and pre-dried coal (having a moisture content less than 1% and a particle size of 100 mesh) in solvent:coal ratio of 1.6:1 with Molyvan A (in an amount equivalent to 250 ppm of elemental Mo, based on the total weight of the Pretreatment Compositions); heating the mixtures to a temperature of 200° C. at a pressure of 500 psig of hydrogen gas; and keeping the mixtures at this temperature and pressure for 120 minutes.

Pretreatment Compositions 21, 22, 2, 15, and 23 were then subjected to a single-stage hydroconversion process at a temperature of 426° C. and pressure of 2550 psig hydrogen gas, for 60 minutes, 60 minutes, 180 minutes, 180 minutes, and 300 minutes, respectively.

The liquid yield %, coal conversion %, gas yield % of each of the Pretreatment Compositions were determined following hydroconversion, and are set forth in Table 9. Each was calculated on a dry, ash-free basis, in the manner discussed in Example 1. Additionally, hydrogen consumption (scf/bbl) during hydroconversion was determined for Pretreatment Compositions 21 and 2. The hydrogen consumption was determined by mass balance calculations.

TABLE 9

| Pretreatment Composition | Liquid yield (%) | Coal Conversion (%) | Gas yield (%) | Hydrogen Consumption (scf/bbl) |
|---|---|---|---|---|
| 21 | 73.75 | 92.78 | 8.42 | 3482.49 |
| 2 | 80.58 | 96.93 | 10.29 | 4963.33 |
| 22 | 38.85 | 64.26 | 10.44 | — |
| 15 | 61.85 | 80.48 | 12.44 | — |
| 23 | 59.22 | 85.41 | 16.74 | — |

As is evident from the results set forth in Table 9, the pretreatment of a carbonaceous material prior to hydroconversion results in improved hydroconversion across different hydroconversion process reaction times. Additionally, as is evident, the concentration of catalyst precursor used in the pretreatment of a carbonaceous material directly affects the liquid yield %, coal conversion %, and gas yield % obtainable from the pretreated carbonaceous material during hydroconversion.

Example 10

The effect of different hydroconversion temperatures on liquid yield, coal conversion, and gas yield of a pretreated carbonaceous material was determined.

Pretreatment Composition 2 was prepared as described in Example 1. Pretreatment Composition 24 was prepared in the same manner as Pretreatment Composition 2, by mixing an FCC-type process oil (500° F.+ cut) and pre-dried coal (having a moisture content less than 1% and a particle size of 100 mesh) in solvent:coal ratio of 1.6:1 with Molyvan A (in an amount equivalent to 1000 ppm elemental Mo, based on the total weight of the Pretreatment Composition); heating the mixture to a temperature of 200° C. at a pressure of 500 psig of hydrogen gas; and keeping the mixture at this temperature and pressure for 120 minutes.

Pretreatment Compositions 2 and 24 were then subjected to a hydroconversion pressure of 2550 psig hydrogen gas and hydroconversion temperatures of (i) 426° C. and (ii) 450° C., respectively, for 180 minutes.

The liquid yield %, coal conversion %, and gas yield % of each of Pretreatment Compositions 2 and 24 were determined following hydroconversion, and are set forth in Table 10. Each was calculated on a dry, ash-free basis.

TABLE 10

| Pretreatment Composition | Liquid yield (%) | Coal Conversion (%) | Gas yield (%) |
|---|---|---|---|
| 2 | 80.58 | 96.93 | 10.29 |
| 24 | 53.64 | 93.47 | 19.89 |

As is evident from the results set forth in Table 10, the pretreatment of a carbonaceous material prior to hydroconversion results in improved hydroconversion across different hydroconversion temperatures. Additionally, as is evident from the results set forth in Table 10, the relative percentages of liquid yield and gas yield attained is directly affected by the hydroconversion temperature.

Example 11

The solvent uptake capacity of a carbonaceous material at room temperature (about 25° C.) (RT) during exposure to different hydrocarbonaceous liquids was determined.

Coal particles (having a moisture content less than 1% and a particle size of 100 mesh) were mixed at RT with the following different hydrocarbonaceous liquids: (i) an FCC-type process oil (500° F.+ cut), C/H=7.46 (ii) a FCC-type process oil (500° F.− cut), C/H=6.27 (iii) an FCC process oil, C/H=6.2, (iv) a hydrotreated FCC process oil, C/H=6.44, and (v) tetralin.

The solvent uptake capacity of the coal particles in each of the hydrocarbonaceous liquids were determined by measuring the weight gain of the coal particles due to solvent exposure per gram of d.a.f. coal. These results are set forth below in Table 11, as well as in FIG. 1.

TABLE 11

| Solvent | Solvent Uptake Capacity (wt. %, d.a.f. coal) |
|---|---|
| FCC oil 500 F.+ | 0.2851 |
| FCC oil 500 F.− | 0.0586 |
| FCC oil | 0.1899 |
| hydrotreated FCC oil | 0.1468 |
| Tetralin | 0.2233 |

Example 12

The solvent uptake capacity of carbonaceous materials at different temperatures, when mixed with different hydrocarbonaceous liquids, was determined.

Coal particles (having a moisture content less than 1% and a particle size of 100 mesh) were mixed with two different hydrocarbonaceous liquids (specifically, FCC-type process oil (500° F.+ cut) and tetralin) at the following different temperatures: room temperature (about 25° C.) (RT); 150° C. (for the mixtures containing tetralin); and 200° C. (for the mixtures containing an FCC-type process oil (500° F.+ cut)).

Figure 2:
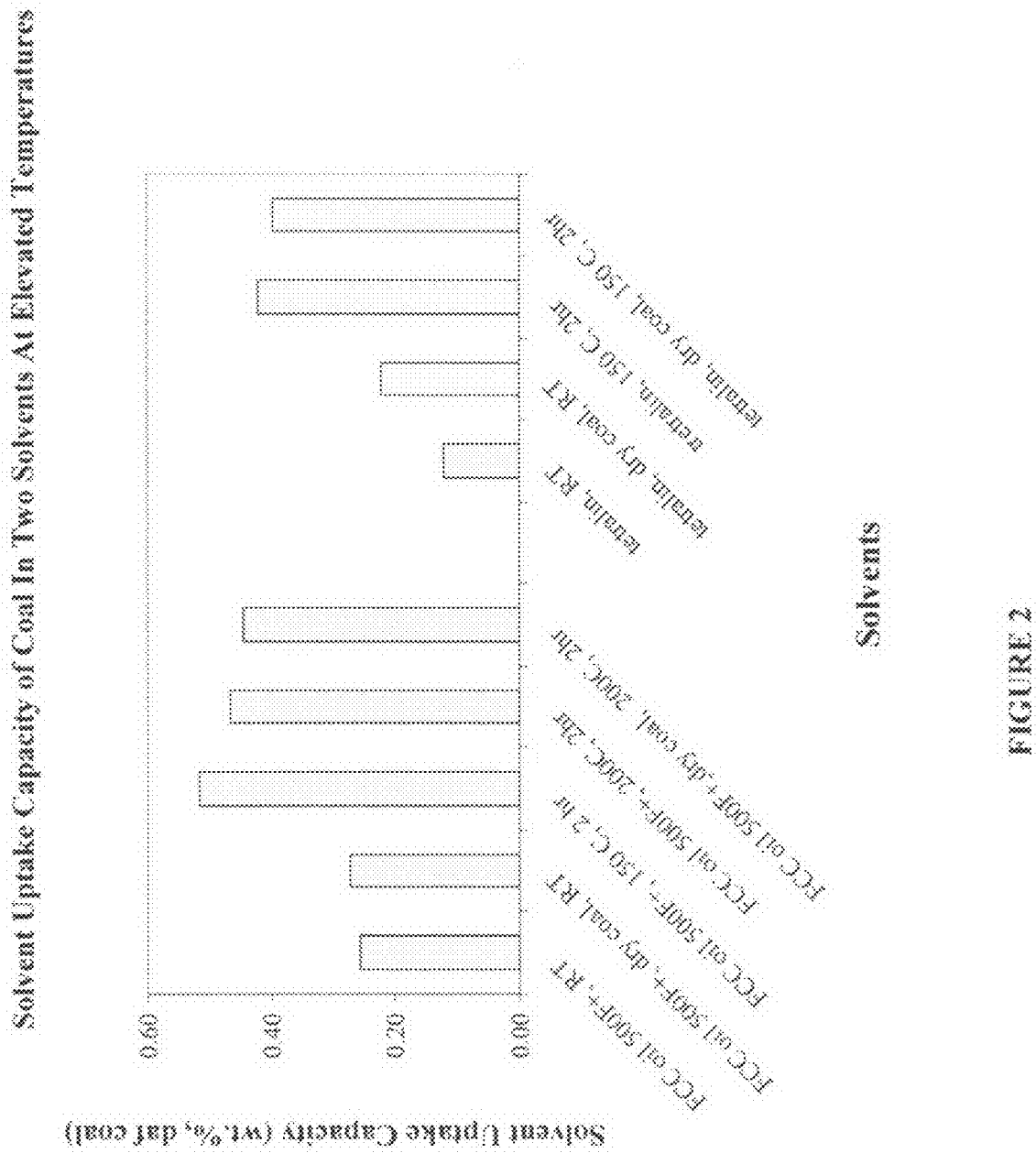
FIG. 2 is a chart showing the swelling capacity of a carbonaceous material in two different hydrocarbonaceous liquids at various pretreatment temperatures.

The solvent uptake capacity of the coal particles in each of the hydrocarbonaceous liquids at each of the temperatures was determined by measuring the weight gain of the coal particles due to solvent exposure, per gram of dry, ash free (d.a.f.) coal. These results are set forth below in Table 12, as well as in FIG. 2.

TABLE 12

| Condition | Solvent Uptake Capacity (wt. %, d.a.f. coal) |
| --- | --- |
| FCC oil 500 F.+, RT | 0.2569 |
| FCC oil 500 F.+, dry coal, RT | 0.2739 |
| FCC oil 500 F.+, 150 C., 2 hr | 0.5159 |
| FCC oil 500 F.+, 200 C., 2 hr | 0.4653 |
| FCC oil 500 F.+, dry coal, 200 C., 2 hr | 0.4455 |
| tetralin, RT | 0.12435 |
| tetralin, dry coal, RT | 0.2233 |
| tetralin, 150 C., 2 hr | 0.421 |
| tetralin, dry coal, 150 C., 2 hr | 0.3975 |

Example 13

Figure 3:
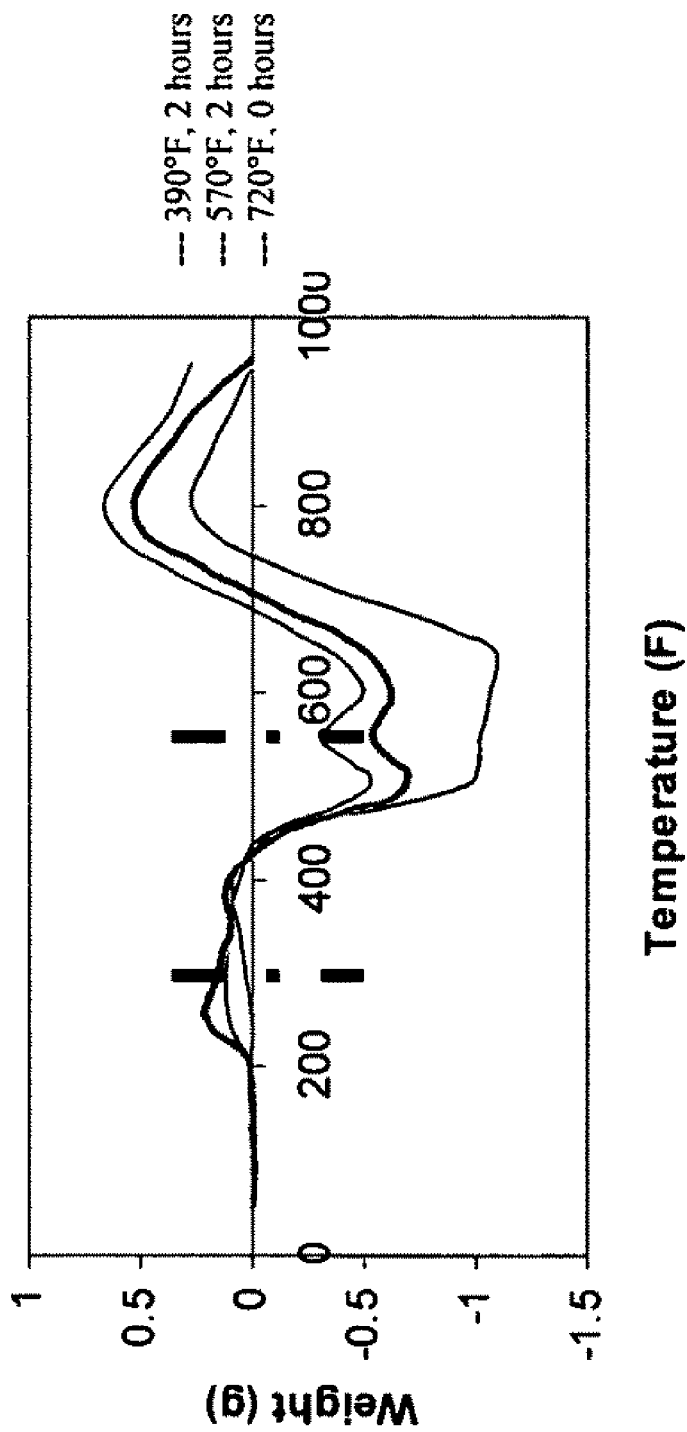
FIG. 3 is a graph showing the solvent uptake of a carbonaceous material at various pretreatment temperatures.

The solvent uptake capacity of carbonaceous materials at different temperatures was simulated at different pretreatment temperatures. Specifically, simulated distillation test results (after subtracting the data for a pure solvent) are illustrated in FIG. 3 for liquids collected after solvent uptake in coal using the following three samples: two samples of coal particles (having a moisture content less than 1% and a particle size of 100 mesh) that are mixed with an FCC-type process oil (500° F.+ cut) and heated at a temperature of 390° F. (200° C.) and 570° F. (300° C.) for 120 minutes, at a pressure 1000 psig of $H_2$; and for a third sample of coal particles (having a moisture content less than 1% and a particle size of 100 mesh) that is mixed with an FCC-type process oil (500° F.+ cut), heated at a temperature of 720° F. (or 380° C.) for 0 minutes, at a pressure of 1000 psig of $H_2$. The 0 minute duration was met by heating the third sample to 380° C., and then immediately removing the sample from the heat source.

As is evident from the simulated distillation test results set forth in FIG. 3, the weight of the solvent increases with pretreatment temperatures below 425° F. (perhaps due to coal dissolution in the solvent); at pretreatment temperatures of 425-750° F., solvent uptake in all three samples occurs (perhaps due to solvent getting adsorbed by coal, as well as extractable coal dissolving into the solvent that is not imbibed by coal); at pretreatment temperatures greater than 750° F., coal dissolution into the solvent occurs to a large extent, and less solvent dispersion into the coal occurs. Also evident from the simulated test results set forth in FIG. 3 is a net loss of the solvent fraction in the temperature range of 425-750° F., due to solvent dispersion into the coal (perhaps, because, in this temperature range, the solvent molecules have affinity to coal and selectively disperse into coal particles).

Example 14

The solvent uptake capacity of carbonaceous materials at different pretreatment reaction times was determined.

Three samples of coal particles having an average particle size of 100 mesh were mixed with an FCC-type process oil (500° F.+ cut), and heated at a temperature of 200° C. under ambient pressure for 30 minutes, 120 minutes, and 300 minutes, respectively.

The solvent uptake capacity of the coal particles in each of the samples was determined by measuring the weight gain of the coal particles due to solvent exposure per gram of d.a.f. coal. These results are set forth in FIG. 4.

Figure 4:
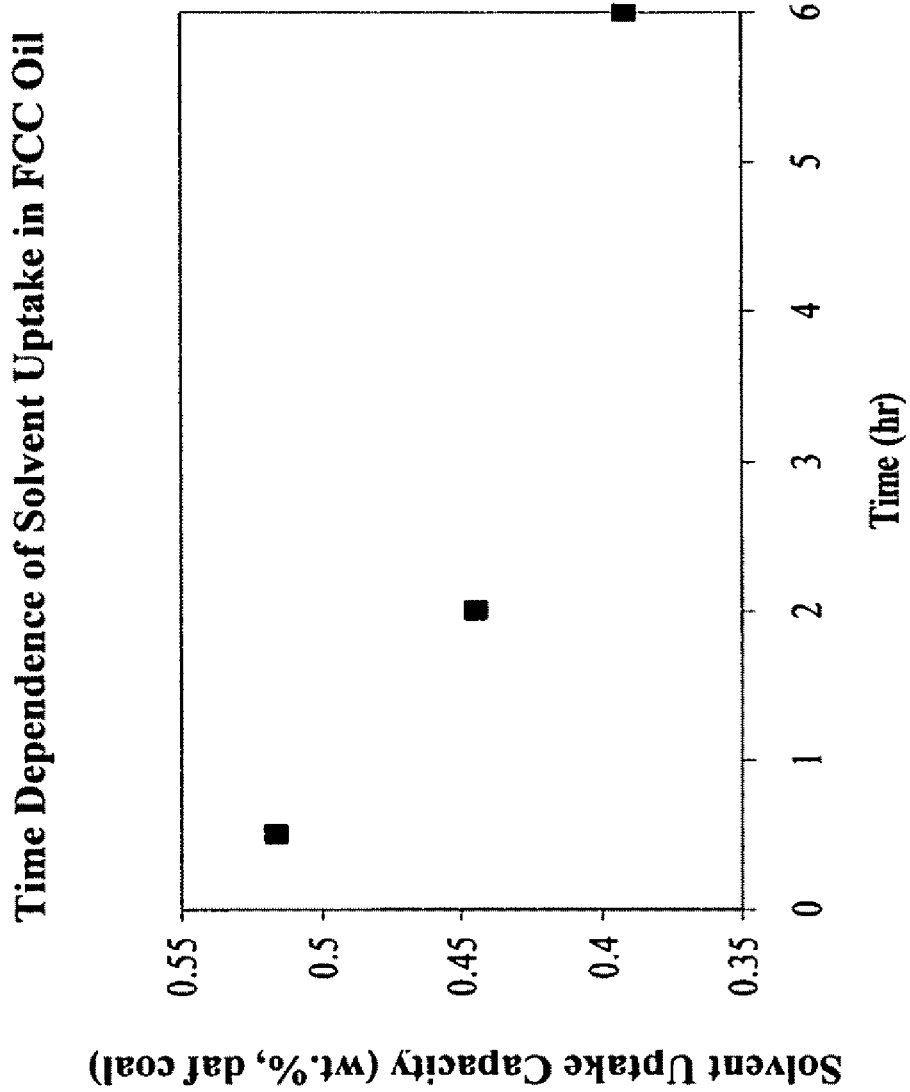
FIG. 4 is a graph showing the swelling capacity of a carbonaceous material at various pretreatment reaction times.

As is evident from the results set forth in FIG. 4, the void size increase capacity of the carbonaceous material is at least partially dependent on the reaction time of the pretreatment.

Example 15

The solubility of Molyvan A in four different hydrocarbonaceous liquids at various temperatures was determined.

Eight compositions ("Compositions 25-32") containing a starting molybdenum solution concentration of 1000 ppm and one of four different hydrocarbonaceous liquids (specifically, an FCC-type process oil (500° F.+ cut); $CH_2Cl_2$; Heptane; or Tetralin) were prepared. The eight solutions were then maintained at room temperature (about 25° C.) (RT), or heated in 30 min to 100-200° C., and the concentration of molybdenum within each sample was determined by Inductively Coupled Plasma (ICP) mass spectroscopy. Each sample was then cooled to RT, and the occurrence (or lack thereof) of precipitation of the Molyvan A was monitored within each sample. These results are set forth in Table 13. Within the Table, the term "Reversible" is used to indicate whether dispersed or dissolved Molyvan A precipitated in the sample upon cool-down to RT.

TABLE 13

Molyvan A dissolution test

| Composition | Temperature (° C.) | Solvent | Soluble | Reversible |
| --- | --- | --- | --- | --- |
| 25 | RT | $CH_2Cl_2$ | yes | no |
| 26 | RT | Heptane | no | |
| 27 | RT | Tetralin | no | |
| 28 | RT | FCC 500 F.+ | no | |
| 29 | 100 | Tetralin | yes (partial) | yes |
| 30 | 100 | FCC 500 F.+ | yes (partial) | yes |
| 31 | 150 | Tetralin | yes (partial, 145 ppm) | yes |
| 32 | 200 | FCC 500 F.+ | yes (complete,) 997 ppm | no |

As is evident from the results set forth in Table 13, the solubility of the catalyst precursor is at least partially dependent on the temperature at which the catalyst precursor is contacted with the hydrocarbonaceous liquid.

Example 16

The temperature required for activation of catalyst precursors was determined via Thermal Gravimetric Analysis (TGA). Specifically, Molyvan A catalyst precursors were subjected to a TGA test that employed temperature ramp programs of (i) 10° C./min from room temperature (about 25° C.) (RT) to 200° C. and (ii) 2° C./min from 200° C. to 426° C.

Figure 5:
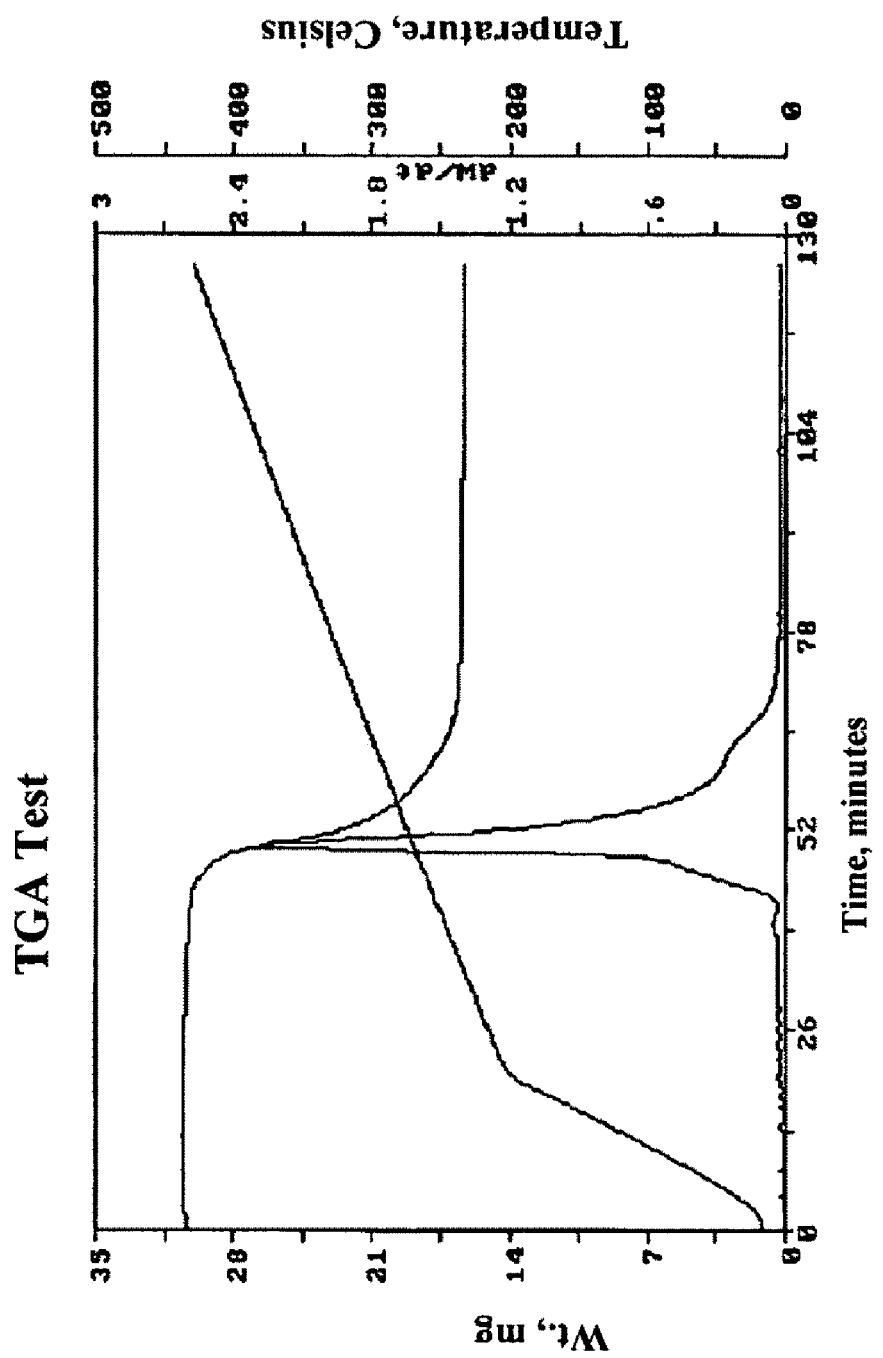
FIG. 5 is a graph showing the activation level of a catalyst precursor at various temperatures.

As is evident from the results set forth in FIG. 5, decomposition of Molyvan A was evident at temperatures between about 258° C. and about 311° C.

In a separate test, decomposition of Molyvan A was assessed in tetralin solvent under $H_2$ pressure. 1 gram of Molyvan A was dissolved in 100 grams of tetralin solvent, the mixture was heated up to 350° C., and then cooled and filtered on 0.8 μm pore size filter paper, with the residue (or filtered solids) being weighed. The temperature at which no residue appeared on the filter was determined. Decomposition of Molyvan A in tetralin, under these test conditions, was determined to be 350° C., and resulted in production of a black powder, which was determined via elemental analysis to include $MoS_2$ (a common active phase for hydro-conversion reactions).

Example 17

The void size and void volume was compared between a dry coal sample and a coal:solvent mixture that was subjected to pretreatment conditions (without a catalyst precursor).

A composition ("Composition 33") was prepared by subjecting a coal sample to drying conditions at 120° C. at atmospheric pressure, under $N_2$ atmosphere for 24 hours, until no change in sample weight is detected. A second composition ("Composition 34") was prepared by contacting dried coal with a FCC process oil 500° F.+ at 200° C. for 2 hours under ambient pressure, followed by filtration under the same temperature.

The average pore width and cumulative volume of pores was determined for each of the two compositions, by performing Barret-Joyner-Halenda (BJH) adsorption and desorption measurements using nitrogen at 77K. Table 14 sets forth the results of these measurements.

TABLE 14

| Composition | BJH adsorption average pore width (nm) | BJH adsorption cumulative volume of pores (cm³/g) | BJH desorption average pore width (nm) | BJH desorption cumulative volume of pores (cm³/g) |
| --- | --- | --- | --- | --- |
| 33 | 24.49 | 0.01577 | 70.59 | 0.08424 |
| 34 | 37.94 | 0.02025 | 97.58 | 0.11910 |

As is evident from the results set forth in Table 14, Composition 34 was found to have a higher average pore width, as well as a higher cumulative volume of pores, as compared to Composition 33.

Example 18

The void size and void volume was compared between a dry coal sample and a coal:solvent mixture that was subjected to pretreatment conditions (without a catalyst precursor).

A composition ("Composition 35") was prepared by subjecting a coal sample to drying conditions at 120° C. at atmospheric pressure, under $N_2$ atmosphere for 24 hours, until no change in sample weight is detected. A second composition ("Composition 36") was prepared by contacting dried coal with tetralin at 150° C. for 2 hours under ambient pressure, followed by filtration under the same temperature.

The average pore width and cumulative volume of pores was determined for each of the two compositions, by performing Barret-Joyner-Halenda (BJH) adsorption and desorption measurements using nitrogen at 77K. Table 15 sets forth the results of these measurements.

TABLE 15

| Composition | BJH adsorption average pore width (nm) | BJH adsorption cumulative volume of pores (cm³/g) | BJH desorption average pore width (nm) | BJH desorption cumulative volume of pores (cm³/g) |
| --- | --- | --- | --- | --- |
| 35 | 39.65 | 0.01215 | 13.56 | 0.01417 |
| 36 | 42.03 | 0.01666 | 69.10 | 0.02125 |

As is evident from the results set forth in Table 15, Composition 36 was found to have a higher average pore width, as well as a higher cumulative volume of pores, as compared to Composition 35.

Example 19

The amount of uptake of catalyst precursor by coal during pretreatment was determined.

A composition ("Composition 37") was prepared by mixing 29.67 grams of d.a.f. coal with 50.43 grams of FCC 500 F+ solvent and 0.319 grams of Molyvan A catalyst precursor, wherein the Mo content of the composition was about 1071 ppm. The composition was heated in an autoclave to 200° C. over the course of 30 minutes, and was maintained at this temperature for 2 hours. The composition was then vacuum filtered at 200° C., using a heated funnel, until free of liquid whereby no effluent was collected in 20 minutes. About 2.1 grams of filtered solids ("pretreated coal") and 36.69 grams of filtrate were sent for Mo elemental analysis.

The remaining 33.57 grams of filtered solids ("pretreated coal") was then washed with 199.84 grams of hot (200° C.) FCC-type process oil (500° F.+ cut) in a heated funnel and vacuum filtered until dry. The filtrate and filtered solids ("washed, pretreated coal") were collected, and Mo elemental analysis were performed on both.

The original weight of Composition 37, as well as the weight of the coal following pretreatment and washing processes are set forth in Table 16. The weight of the filtrates collected from the pretreatment and washing processes are also set forth in Table 16. The mass difference between the original weight of Composition 37 and the total weight following pretreatment set forth in Table 16 was due to material loss during transfer and evaporation on heating.

The original concentration of Mo in Composition 37, as well as the Mo concentration within both the pretreated coal and the washed, pretreated coal, are set forth in Table 17. Additionally, Table 17 sets forth the Mo concentration within the filtrates collected from the pretreatment and washing processes.

TABLE 16

| Original Weight Of Comp. 37 | | | | Weight Following Pretreatment | | | Weight Following Pretreatment And Washing | | |
| --- | --- | --- | --- | --- | --- | --- | --- | --- | --- |
| Coal | Solvent | Catalyst Precursor | Total | Pretreated Coal | Filtrate | Total | Washed, Pretreated Coal | Filtrate | Total |
| 29.67 | 50.43 | 0.32 | 80.42 | 35.67 | 36.69 | 72.36 | 36.81 | 193.07 | 233.41 |

TABLE 17

| Comp. | Mo Conc. in Original Reaction Mixture (ppm) | Mo Conc. in Pretreated Coal (ppm) | Mo Conc. in Filtrate From Pretreatment Process (ppm) | Mo Conc. in Washed, Pretreated Coal (ppm) | Mo Conc. of Washing Solvent Following Washing Process (ppm) |
|---|---|---|---|---|---|
| 37 | 1071 | 1787 | 405 | 1643 | <28 |

As is evident from the results set forth in Table 16, the weight of the coal increased with pretreatment. As is evident from the results set forth in Table 17, the Mo concentration in the pretreated coal than it is in the original composition (prior to the pretreatment process). Additionally, as is evident from Table 17, the Mo concentration in the Washing Solvent Following the washing process was below the detection limit, which might indicate that the wash of the pretreated coal with fresh hot (200° C.) FCC-type process oil (500° F.+ cut) did not remove Mo catalyst precursor from pretreated coal.

Example 20

The effect of pretreatment with catalyst or catalyst precursor on liquid yield, coal conversion, and gas yield of a carbonaceous material was determined.

A first composition ("Composition 38") was prepared by mixing an FCC-type process oil (500° F.+ cut) and pre-dried coal 100 mesh particles (having a moisture content less than 1%) at a solvent to coal (moisture free) ratio of 1.7:1.

Two catalyst precursor-containing compositions ("Compositions 39-40") were prepared by mixing an FCC-type process oil (500° F.+ cut) and pre-dried 100 mesh particles of coal (having a moisture content less than 1%) with Molyvan A in an amount equivalent to 1000 ppm elemental Mo, based on the total weight of each pretreatment composition, wherein the solvent to coal (moisture free) ratio was 1.75:1.

Two catalyst-containing compositions ("Compositions 41-42") were prepared by mixing an FCC-type process oil (500° F.+ cut) and pre-dried 100 mesh particles of coal (having a moisture content less than 1%) with VRSH Ni/Mo catalyst in the form of dispersion of 4.5 wt. % Mo in vacuum gas oil (VGO) in the amount equivalent to 1000 ppm elemental Mo in the reaction mixture, wherein the solvent to coal (moisture free) ratio was 1.75:1.

Each of Compositions 38-42 was heated in 1 L stirred autoclaves to a temperature of 200° C., pressurized to 500 psig of hydrogen gas, and kept the temperature and pressure for a duration of 120 minutes.

Following pretreatment, Compositions 38-42 were subjected to a hydroconversion temperature of 426° C. and a hydroconversion pressure of 2550 psig of hydrogen gas, for a reaction time of 180 minutes.

The liquid yield %, coal conversion %, gas yield %, and $CH_4$ formation of each of Compositions 38-42 were determined following hydroconversion, and are set forth in Table 18. Each was calculated on a dry, ash-free basis (d.a.f.) in the following manner. In particular, liquid yield was calculated using the following equation: liquid yield=100%×(toluene soluble liquid/d.a.f. coal). Gas yield was calculated using the following equation: gas yield=100%×($C_1$-$C_3$+CO+$CO_2$+$H_2S$+$NH_3$)/d.a.f. coal. Gas analysis was performed using gas chromatography.

TABLE 18

| Composition | Liquid yield (%) | Coal Conversion (%) | Gas Yield (%) | $CH_4$ Formation (g) |
|---|---|---|---|---|
| 38 | 35.53 | 52.55 | — | 0.872 |
| 39 | 81.68 | 97.64 | 12.36 | 0.264 |
| 40 | 81.31 | 96.93 | 10.16 | 0.543 |
| 41 | 78.26 | 91.56 | 13.99 | 0.591 |
| 42 | 79.55 | 91.51 | 14.31 | 0.635 |

As is evident from the results set forth in Table 18, higher coal conversion and liquid yield were achieved in the samples that were pretreated with catalyst or catalyst precursor (Compositions 39-42) than in the sample that was not subjected to pretreatment with catalyst or catalyst precursor (Composition 38). Additionally, as is evident from the results set forth in Table 18, less $CH_4$ formation occurred in the samples that were pretreated with catalyst precursor (Compositions 39-40) than in those samples pretreated with catalyst (Compositions 41-42), which may be due, at least in part, to the presence of nickel in the catalyst, which may promote the formation of CH4 through methanation reaction.

All publications and patent applications mentioned in this specification are herein incorporated by reference to the same extent as if each individual publication or patent application was specifically and individually indicated to be incorporated by reference.

It will be apparent to one of ordinary skill in the art that many changes and modification can be made to the disclosures presented herein without departing from the spirit or scope of the appended claims.

What is claimed is:

1. A method for pretreating a carbonaceous material, comprising heating a mixture comprising:
   (a) the carbonaceous material;
   (b) one or more catalyst precursors, and
   (c) a hydrocarbonaceous liquid; to a temperature sufficient and for a time sufficient to cause one or more catalyst precursors to disperse into the carbonaceous material; wherein one or more catalysts are formed by sulfiding the one or more catalyst precursors with a sulfiding agent added in the form of a powder, a liquid solution, or a concentrated dispersion.

2. The method of claim 1, wherein no measurable hydroconversion of the carbonaceous material occurs during the pretreating.

3. The method of claim 1, wherein the one or more catalysts or catalyst precursors have substantially no catalytic activity during the pretreating.

4. The method of claim 1, wherein one or more of the one or more catalyst precursors is formed prior to and/or during the pretreating.

5. The method of claim 1, wherein the mixture is heated to a temperature of about 100-350° C. for about 10-600 minutes.

6. The method of claim 1, wherein one or more of the one or more catalyst precursors comprises molybdenum, tungsten, vanadium, chromium, cobalt, titanium, iron, nickel, or a mixture of at least two thereof.

7. The method of claim 1, wherein the sulfiding of the one or more catalyst precursors comprises:
   (a) sulfiding an ammonium-containing Group VIB metal compound in an aqueous phase, at a temperature less than about 177° C., to form a presulfided product; and
   (b) separating ammonia from said presulfided product to form a sulfided product.

8. The method of claim 1, wherein the sulfiding of the one or more catalysts comprises:
   (a) sulfiding an ammonium-containing Group VIB metal compound in an aqueous phase, at a temperature less than about 177° C., to form a presulfided product;
   (b) separating ammonia from said presulfided product to form a sulfided product; and
   (c) charging said sulfided product into a hydroprocessing reactor zone at a temperature sufficient to convert said sulfided product in the presence of hydrogen and hydrocarbon oil into one or more active hydroprocessing catalysts.

9. The method of claim 8, wherein the one or more hydroprocessing catalysts are characterized by one or more of a pore volume of about 0.1-1 cc/g, a radius pore size of 10-300 angstroms, and a surface area of from about 20-400 $m^2/g$.

10. The method of claim 1, wherein the hydrocarbonaceous liquid is a FCC process oil having a boiling point of at least about 500° F.

11. The method of claim 1, wherein less than about 5% hydroconversion of the carbonaceous material occurs during the pretreating.

12. The method of claim 1, wherein less than about 30 wt. % of the one or more catalysts exhibits catalytic activity during the pretreating.

13. The method of claim 1, wherein the one or more catalysts or catalyst precursors comprises a metal selected from the group consisting of: a Group IIB metal; a Group IIIB metal; a Group IVA metal; a Group IVB metal; a Group VB metal; a Group VIB metal; a Group VIIB metal; a Group VIII metal; or a combination or mixture thereof.

14. The method of claim 1, wherein the one or more catalysts or catalyst precursors comprises molybdenum.

15. A method for improving efficiency of carbonaceous material liquefaction, comprising:
   i) heating a mixture comprising:
      a) the carbonaceous material;
      b) one or more catalyst precursors, and
      c) a hydrocarbonaceous liquid; to a temperature sufficient and for a time sufficient to cause one or more catalyst precursors to disperse into the carbonaceous material to form a pretreated carbonaceous material; and
   ii) hydroconverting the pretreated carbonaceous material; wherein one or more catalysts are formed by sulfiding the one or more catalyst precursors with a sulfiding agent added in the form of a powder, a liquid solution, or a concentrated liquid dispersion.

16. The method of claim 15, wherein no measurable hydroconversion of the carbonaceous material occurs during the heating step.

17. The method of claim 15, wherein the mixture is heated to a temperature of about 100-350° C. for about 10-600 minutes, and wherein the hydroconverting step is performed at a temperature greater than about 400° C.

18. The method of claim 15, wherein said hydroconverting achieves a liquid yield greater than about 60%.

19. The method of claim 18, wherein said hydroconverting step is performed at a pressure less than about 2000 psig.

* * * * *